US010884161B2

(12) United States Patent
Cao

(10) Patent No.: US 10,884,161 B2
(45) Date of Patent: Jan. 5, 2021

(54) METHOD FOR AUTOMATICALLY EXTRACTING STRUCTURAL FRAMEWORK FROM POTENTIAL FIELD DATA

(71) Applicant: Institute of Mineral Resources, Chinese Academy of Geological Sciences, Beijing (CN)

(72) Inventor: Dianhua Cao, Beijing (CN)

(73) Assignee: Institute of Mineral Resources, Chinese Academy of Geological Sciences, Beijing (CN)

( * ) Notice: Subject to any disclaimer, the term of this patent is extended or adjusted under 35 U.S.C. 154(b) by 357 days.

(21) Appl. No.: 15/555,153

(22) PCT Filed: Mar. 4, 2016

(86) PCT No.: PCT/CN2016/075626
§ 371 (c)(1),
(2) Date: Sep. 1, 2017

(87) PCT Pub. No.: WO2016/138874
PCT Pub. Date: Sep. 9, 2016

(65) Prior Publication Data
US 2018/0052251 A1 Feb. 22, 2018

(30) Foreign Application Priority Data

Mar. 4, 2015 (CN) .......................... 2015 1 0096981
Jun. 4, 2015 (CN) .......................... 2015 1 0303316

(51) Int. Cl.
*G01V 3/08* (2006.01)
*G06T 17/05* (2011.01)
(Continued)

(52) U.S. Cl.
CPC ............ *G01V 11/002* (2013.01); *G01V 3/081* (2013.01); *G01V 3/38* (2013.01); *G01V 7/06* (2013.01);
(Continued)

(58) Field of Classification Search
CPC .......... G01V 3/38; G01V 7/06; G01V 11/002; G01V 3/081; G06T 7/13; G06T 17/05;
(Continued)

(56) References Cited

U.S. PATENT DOCUMENTS 7,079,135 B2 7/2006 Kim
2006/0008144 A1* 1/2006 Prasad ..................... G06T 9/00
382/173
(Continued)

FOREIGN PATENT DOCUMENTS

CN 101256676 9/2008
CN 101520518 9/2009
(Continued)

OTHER PUBLICATIONS

International Search Report of PCT/CN2016/075626 dated Jun. 3, 2016, 6 pages (English and Chinese).
(Continued)

*Primary Examiner* — Stephanie E Bloss
(74) *Attorney, Agent, or Firm* — Rankin, Hill & Clark LLP

(57) ABSTRACT

A method for automatically extracting a tectonic framework of a potential field includes preprocessing gravity potential field data and/or magnetic potential field data from an area to be researched; performing multi-scale and multi-direction edge detection on the preprocessed gravity potential field data and/or magnetic potential field data, and obtaining edges of all scales separately; thinning the calculated edge of each scale into a single pixel width by means of a morpho-
(Continued)

logical skeleton algorithm, each point having depth and strength attributes; and obtaining a comprehensive tectonic framework graph and a comprehensive tectonic strength framework graph. A geological structure formed by a control deposit can be identified and qualitatively interpreted, a potential deposit type and attributes of the structure are determined according to prior knowledge of an area to be researched, and different types of tectonic frameworks are screened, thereby achieving target area localization of a metal deposit.

20 Claims, 12 Drawing Sheets

(51) Int. Cl.
*G01V 11/00* (2006.01)
*G01V 3/38* (2006.01)
*G06T 7/13* (2017.01)
*G01V 7/06* (2006.01)

(52) U.S. Cl.
CPC ............... *G06T 7/13* (2017.01); *G06T 17/05* (2013.01); *G06T 2207/20016* (2013.01); *G06T 2207/20044* (2013.01); *G06T 2207/20064* (2013.01); *G06T 2207/20182* (2013.01); *G06T 2207/30181* (2013.01)

(58) Field of Classification Search
CPC . G06T 2207/30181; G06T 2207/20016; G06T 2207/20044; G06T 2207/20064; G06T 2207/20182
See application file for complete search history.

(56) References Cited

U.S. PATENT DOCUMENTS

| | | | | |
|---|---|---|---|---|
| 2007/0103464 A1* | 5/2007 | Kaufman | ............... | G06T 7/0012 345/424 |
| 2008/0018646 A1* | 1/2008 | Farag | ........................ | G06T 7/64 345/424 |
| 2010/0161232 A1* | 6/2010 | Chen | ...................... | G01V 1/302 702/16 |
| 2010/0296712 A1* | 11/2010 | Chiang | ................. | G06T 7/0014 382/131 |
| 2011/0115787 A1* | 5/2011 | Kadlec | ....................... | G06T 7/12 345/419 |
| 2015/0262417 A1* | 9/2015 | Koroteev | ................ | G06T 5/002 382/109 |
| 2017/0273651 A1* | 9/2017 | Behrooz | .............. | A61B 6/5217 |

FOREIGN PATENT DOCUMENTS

| | | |
|---|---|---|
| CN | 100559400 C | 11/2009 |
| CN | 102236108 | 11/2011 |
| CN | 102937725 | 2/2013 |
| CN | 103955007 | 7/2014 |
| CN | 104658037 | 5/2015 |
| CN | 104965232 | 10/2015 |

OTHER PUBLICATIONS

Lam, L. et al.: "Thinning Methodologies—A Comprehensive Survey", IEEE Transactions on Pattern Analysis and Machine Intelligence, vol. 14, No. 9, Sep. 1992, pp. 869-885.
Cao, D.: "Porphyry Copper Deposit Model and Exploration Technique in Zhongdian, Yunnan", China Doctoral Dissertations Full-Text Database (Basic Sciences), No. 2, Feb. 15, 2008, ISSN: 1674-022X, pp. 46-57, w/ English Abstract.
Jacobsen, B.H., "A Case for Upward Continuation as a Standard Separation Filter for Potential-Field Maps," Geophysics, v. 52, No. 8, 1987.
B. Verduzco et al., "New Insights into Magnetic Derivatives for Structural Mapping," The Leading Edge, v. 23, No. 2, 2004.
Office Action of Chinese Serial No. 201510096981.9 dated Jan. 23, 2017, 8 pages.
Y. Jiayong, et al. "Structural Framework Study of Metallogenic Belts in the Middle and Lower Reaches of the Yangtze River Based on Gravitational-Magnetic Multi-Scale Edge Detection," Journal of Geology, vol. 85, No. 5, pp. 900-914, May 2011. (Cited in Office Action of Chinese Serial No. 201510096981.9 dated Jan. 23, 2017 and with English Abstract).
L. Jinlan et al., "Comparative Study of Magnetic Source Boundary Picking Methods in Low Latitude regions," Proceedings of the 23rd Annual Meeting of the Chinese Geophysical Society, p. 459, Oct. 2007. (cited in Office Action of Chinese Serial No. 201510303316.2 dated Aug. 16, 2017).
Office Action of Chinese Serial No. 201510303316.2 dated Dec. 26, 2016, 8 pages.
Office Action of Chinese Serial No. 201510303316.2 dated Aug. 16, 2017, 8 pages.

\* cited by examiner

METHOD FOR AUTOMATICALLY EXTRACTING STRUCTURAL FRAMEWORK FROM POTENTIAL FIELD DATA

FIELD OF THE INVENTION

The present invention relates to a method for automatically extracting structural framework from gravity potential field data and magnetic potential field data, which is a technique for detecting geological structure based on gravity anomaly data and magnetic anomaly data. More specifically, the present invention is in the fields of wavelet analysis, image processing, geophysics, geology and mineral exploration. The method of the present invention can be directly applied to the fields of mineral exploration and related geological survey.

BACKGROUND

With the development of airborne geophysical exploration technology, gravity and magnetic (hereunder called as "gravity-magnetic") measurement methods have the advantages of economy, rapidness and covering landscape areas which are difficult to reach, and play a more and more important role in exploration and evaluation of metal ore deposits. Especially, with the development of high-precision aeromagnetic survey technique, methods for detecting geological structures controlling formation of the ore deposits based on the magnetic anomaly data are very important in all exploration stages from region selection to target selection. At present, in the field of mineral exploration, gravity-magnetic exploration are usually applied to direct detection of strong-magnetism or high-density mineralized bodies, and to interpretation and inversion of strong-anomaly geological structures. Most nonferrous metal and rare metal ore deposits cannot directly form obvious gravity-magnetic anomalies. However, geological structures controlling the formation of ore deposits can produce anomaly differences. Therefore, detection of geological structures controlling the formation of ore deposits based on gravity potential field data and magnetic potential field data is important in localization of the targets of metal ore deposits.

Nowadays, methods for automatically identifying and extracting structural information from gravity-magnetic potential fields mainly include analytic signal method, Euler deconvolution method, multiscale edge detection method of potential field, etc. These methods have problems of being not sensitive to directional information, and cannot obtain complete and accurate anomaly boundary locations. A Chinese patent application No. 200810006676.6, titled "Multi-directional and Multiscale Edge Detection Method of Potential Field" of the applicant of the present invention discloses a multidirectional and multiscale edge detection method of potential field, which enhances directional information through directional wavelet transform, obtains information about anomaly source boundaries in different directions, achieves automatic extraction of structural framework, overcomes the problem of being not sensitive to directional information in analytic signal method, Euler deconvolution method and multiscale edge detection method of potential field, and is a technical solution for rapid inversion of three-dimensional structures of shallow crusts based on potential field data. However, this method still has the following problems: (1) the edges obtained through calculation are not single-pixel point width, actual geographical ranges corresponding to the edges and the intersections of the edges in different directions are large, which causes the accuracy of analysis result not high; (2) a three-dimensional structural map of shallow crusts is obtained by artificial vectorization to different scales of edges and taking connection lines of edge centers as anomaly boundaries, which causes a low working efficiency; (3) the three-dimensional structural map of shallow crusts shows only information about structures at different depths, cannot reflect lithological changes of structural belts and of the two sides, and cannot indicate deformation and activity intensity of structures; and (4) scales are not clearly defined, i.e., no specific geophysical attribute is given to the feature of scale. Therefore, there is a need on a method capable of precisely extracting a structural framework from potential field based on the acquired potential field data.

Furthermore, compared to gravity anomalies, magnetic anomalies are more complex due to the influence of magnetization direction. Usually, the Total magnetic intensity (TMI) recorded by a modern magnetometer is a component in a direction in parallel with the direction of the main magnetic field of the Earth. By performing international geomagnetic reference field correction to TMI, TMI anomalies can be obtained. Due to the influence of oblique magnetization, TMI anomalies have the problems of lateral deviation, pattern deformation, as well as positive and negative value change, for example. Usually, the influence of the above factors is eliminated by reduction-to-pole processing to TMI anomaly data. With the reduction-to-pole, the observed TMI anomalies are transformed into vertical magnetic anomalies under the vertical magnetization situation, i.e., the observed TMI anomalies are transformed into the anomalies which can be measured at the north magnetic pole, such that magnetic anomalies are migrated to the locations directly above their sources to facilitate geological interpretation of magnetic anomalies.

However, under the influence of the small magnetic inclination and noise, it is difficult to obtain reliable magnetic anomaly data with vertical magnetization by performing reduction to pole to TMI anomalies data in low-latitude (which usually refers to a magnetic inclination in range of ±20°) areas. Current methods for automatically identifying and extracting magnetic structure information from the TMI anomaly data after reduction to pole, such as analytic signal method, Euler deconvolution method, phase symmetry, multiscale edge detection method of potential field data and multidirectional and multiscale edge detection method of potential fiend data are not adapted to automatic identification of magnetic structure information in low-latitude areas.

Therefore, there is a need to provide a method capable of precisely extracting a geological structural framework based on data of magnetic anomalies in low-latitude areas.

BRIEF DESCRIPTION

The purpose of the present invention is to provide a method for automatically extracting structural framework from gravity-magnetic potential field data, to rapidly obtain information about geological structures controlling the formation of the ore deposits so as to achieve localization of the targets of metal ore deposits. The present invention further provides a method for automatically extracting magnetic structural framework in low-latitude areas, which not only obtains lineaments, but also obtain ring structures. The present invention defines the structure thus obtained as a structural framework.

In order to achieve this purpose, the present invention provides a method comprising extracting gravity structural framework or magnetic structural framework by applying a multidirectional and multiscale edge detection to the measured gravity potential field data and magnetic potential field data, thinning the obtained structural framework of each scale into a single-pixel width with a morphological skeleton algorithm; highlighting information about structures at different depths by rendering the structural frameworks at different scales with different gradually changing colors and stacking on upon the other, to generate a composite structural framework map; and highlighting the intensity information of density change and magnetism change by rendering the structural intensity values extracted from gradient modulus corresponding to each edge point on structural frameworks at different scales with different gradually changing colors and stack one upon the other, to generate a composite structural intensity framework map. Thereby, the solution of the invention may obtain information about gravity-magnetic anomalies at different depths in a study area, information about distribution of structural frameworks representing geological structures at different depths and information about intensity of density change and magnetism change of structural frameworks at different depths, to identify and qualitatively interpret geological structures controlling the formation of ore deposits, and may determine the potential ore deposit types and attributes of structures controlling the formation of ore deposits according to priori knowledge about the study area, to screen the different types of structural frameworks, to localize the targets of metal ore deposits.

The present invention provides a method for automatically extracting a structural framework of potential field, comprising the following steps:

1) Preprocessing is performed to the gravity data or magnetic data measured from an study area.

The preprocessing comprises reducing the magnetic data to the pole to obtain reduction-to-pole magnetic anomalies or pseudo-gravity transforming the magnetic data to pseudo-gravity anomalies; or preprocessing the gravity data to obtain Bouguer gravity anomalies.

2) Applying multidirectional edge detection of the potential field data respectively to the preprocessed gravity potential field data or magnetic potential field data at a plurality of scales, comprises upward continuing the potential field data for a plurality of predetermined heights to obtain gravity potential field data or magnetic potential field data at the plurality of scales, and applying multidirectional edge detection respectively to the obtained potential field data at each scale to obtain the potential field edges of the scale.

By selecting different directions a to apply edge detection for each scale upward-continued for the plurality of the predetermined heights, information about edges in different directions may be highlighted. In order to achieve complete coverage, the direction value a is taken as $k\pi/(2^{n-1})$, wherein $k=0, 1, 2 \ldots (2^n-1)$ and n is an integer greater than or equal to 2. In each direction, the points with local maximum of modulus of two-dimensional directional wavelet transform of the preprocessed gravity data or magnetic data are connected in a direction perpendicular to the gradient to form curves and create edges. Edges calculated in a plurality of different directions at the same scale are obtained, a union of all the obtained edges is taken as the edges at the scale, and thereby multidirectional edge detection of the potential field data at all scales can be achieved.

3) Thinning the calculated edges at the scales into single-pixel width respectively by using a morphological skeleton algorithm to obtain structural frameworks at the scales.

4) Stacking the calculated structural frameworks of the scales one upon the other to generate a composite structural framework map.

The obtained structural frameworks at all scales are stacked to generate a composite structural framework map reflecting information at different depths. The lateral deviation of edges at different scales on the map reflects information about attitude of structural frameworks.

By corresponding the edges extracted from the potential fields upward-continued for different heights to structures at different depths, with the depth being half of the height after upward continuation (see A Case for Upward Continuation as a Standard Separation Filter for Potential-Field Maps, Jacobsen, B. H., Geophysics, v. 52 no. 8, 1987), the structural framework maps representing different depths may be obtained.

5) Taking the gradient modulus at each edge point on the calculated edges as an intensity value of this edge point on the structural framework. The magnitude of the intensity values of the edge points on the structural framework to which intensity values are assigned reflects the magnitude of lithological changes of a structural belt and two sides, and reflects intensity of deformation and activity of the structure. By creating the intensity framework maps of different scales to reflect information at different depths, and by stacking the intensity framework maps of different scales to generate the composite structural intensity framework map, the regional geological tectonic framework is revealed.

Further, total horizontal derivatives of tilt derivatives (TDR) and analytic signals of TMI anomaly data are not influenced by magnetic inclination, calculation results are not related to the magnitude of magnetic inclination, and calculation of total derivatives of TDR and analytic signals may be directly performed to TMI anomaly data without reduction-to-pole processing. However, calculation results of analytic signal method may increase the range of magnetic anomalies, loss geological structure attitude information and structure zoning information and be not sensitive to identification of geological structures. However, current results of total horizontal derivatives of tilt derivatives are expressed in form of grid images or contour maps, and useful information for geological interpretation and mineral exploration such as structure depth, primary and secondary relation, cutting relation and magnetic intensity cannot be represented. The traditional edge detection method based on horizontal gradient without considering the directional information of data may not obtain the complete and accurate boundary locations of source bodies of magnetic anomalies. By applying multidirectional edge detection based on total horizontal derivatives of tilt derivatives at a plurality of scales to the preprocessed TMI anomaly data, the present invention can effectively identify and establish magnetic structural frameworks in low-latitude areas. Therefore, the method for automatically extracting the structural framework according to the present invention is particularly applicable to automatic extraction of structural frameworks of magnetic measure data in low-latitude area.

According to one aspect of the present invention, the invention provides a method for automatically extracting a structural framework from a potential field data, comprising the following steps:

preprocessing the potential field data from a study area;

upward continuing the preprocessed potential field data for a plurality of predetermined heights to obtain a plurality of potential field data at the corresponding scales;

applying multidirectional edge detection respectively to the plurality of potential field data at the scales to obtain a plurality of potential field edges at the corresponding scales; and thinning the obtained potential field edges at the scales respectively into a single-pixel width with a morphological skeleton algorithm to obtain a plurality of structural framework maps at the corresponding scales.

Preferably, the method further comprises stacking one upon the other the obtained plurality of structural framework maps at the corresponding scales to generate a composite structural framework map.

Preferably, the method further comprises using the gradient modulus of each edge point on the structural framework map at each scale as an intensity value of the edge point on the structural framework map at the scale to obtain the plurality of structural intensity framework maps at the corresponding scales.

Preferably, the method further comprises stacking the plurality of structural intensity framework maps at the corresponding scales one upon the other to generate a composite structural intensity framework map.

Preferably, the potential field data are gravity potential field data or magnetic potential field data, and the step of preprocessing further comprises: preprocessing the gravity data to obtain Bouguer gravity anomalies; or reducing the magnetic data to the pole to obtain reduction-to-pole magnetic anomalies or applying pseudo-gravity transformation to the magnetic data to obtain pseudo-gravity anomalies.

Preferably, the step of applying multidirectional edge detection to the potential field data at each scale comprises the following steps:

supposing that the scale $s=z/z_0$, $z>z_0$, $z_0$ is the measurement height and z is height increasing upward, defining a gravity anomaly or magnetic anomaly at a location (x, y) at height of zero as $f_0(x, y)$, defining a smoothing function at the scale s as:

$$\theta_s(x,y)=s^{-2}\theta(x/s+y/s)=\gamma_{sz_0}(x,y),$$

wherein $$\gamma_{sz_0}(x, y) = \frac{1}{2\pi}k(x, y, sz_0),$$

$k(x, y, z)$ is the Green's function, defining a wavelet function in direction a as:

$$\psi^\alpha = \left(\cos\alpha\frac{\partial}{\partial x} + \sin\alpha\frac{\partial}{\partial y}\right)\theta(x, y) = D^\alpha\theta(x, y),$$

wherein D represents a first-order derivative;

for the scale s and the location (x, y), defining wavelet transform of the gravity anomaly or magnetic anomaly $f_0(x, y)$ in direction a as:

$$W^\alpha[f_0](x, y, s) = [f_0 * \psi_+^\alpha](x, y)$$
$$= f_0 * (sD^\alpha\theta_s)$$
$$= sD^\alpha[f_0 * \theta_s]$$
$$= sD^\alpha[f_0 * \gamma_{sz_0}]$$

wherein * represents convolution operation, it is known that $f_z(x, y)=f_0(x, y)*\gamma_{sz_0}(x, y)$ according to a potential field upward continuation formula, and $f_z(x, y)$ is a gravity anomaly or a magnetic anomaly via upward continuation of $f_0(x, y)$ from height zero to height $z=sz_0$ and is obtained by upward continuing the gravity anomaly or magnetic anomaly $f_{z_0}(x, y)$ measured at measurement height $z_0$ for height $z-z_0$, hence, $$W^\alpha[f_0](x,y,s)=sD^\alpha f_z(x,y)$$

$$=(z/z_0)D^\alpha f_z(x,y);$$

further, for the scale s and the location (x, y), defining a wavelet transform of the gravity anomaly or magnetic anomaly $f_0(x, y)$ in direction $$a+\frac{\pi}{2}$$

as:

$$W^{\alpha+\frac{\pi}{2}}[f_0](x, y, s) = (z/z_0)D^{\alpha+\frac{\pi}{2}}f_z(x, y),$$

so, the two-dimensional wavelet transform of $f_0(x, y)$ is written as in gradient:

$$W[f_0](x, y, s, \alpha) = \begin{pmatrix} W^\alpha[f_0](x, y, s) \\ W^{\alpha+\frac{\pi}{2}}[f_0](x, y, s) \end{pmatrix} = (z/z_0)\begin{pmatrix} D^\alpha f_z(x, y) \\ D^{\alpha+\frac{\pi}{2}}f_z(x, y) \end{pmatrix}$$

$$W[f_0](x, y, s, \alpha) = (z/z_0)\nabla f_z(x, y, \alpha)$$

wherein $\nabla$ denotes the two-dimensional gradient, and for the location (x, y), the scale s and the direction a, a two-dimensional direction wavelet transform $W[f_0](x, y, s, \alpha)$ of $f_0(x, y)$ is in direct proportion to gradient $\nabla f_z(x, y, \alpha)$ of $f_z(x, y)$, and the two-dimensional direction wavelet transform $W[f_0](x, y, z, \alpha)$ of $f_0(x, y)$ may be represented by the gradient $\nabla f_z(x, y, \alpha)$ of $f_z(x, y)$, for height z, defining the modulus of the gradient $\nabla f_z(x, y, \alpha)$ as:

$$M[f_z](x, y, \alpha) = \sqrt{|D^\alpha f_z(x, y)|^2 + |D^{\alpha+\frac{\pi}{2}}f_z(x, y)|^2},$$

wherein the corresponding argument of the gradient along the horizontal direction is:

$$Af_z(x, y, \alpha) = \text{argument}(D^\alpha f_z(x, y) + D^{\alpha+\frac{\pi}{2}}f_z(x, y)),$$

and defining the point where the modulus $M[f_z](x, y, \alpha)$ is local maximum along argument direction $Af_z(x, y, \alpha)$ as an edge point, forming a curve by connecting points with local maximum of gradient modulus in a direction perpendicular to the gradient to create an edge, and for the same height, calculating the edges in a plurality of different directions a and taking a union of calculated edges as the potential field edges at the corresponding scales.

Preferably, the step of calculating the edges in the plurality of different directions a for the same height further comprises: taking the direction value a as $k\pi/(2^{n-1})$, wherein $k=0, 1, 2 \ldots (2^n-1)$ and n is an integer greater than or equal to 2, so as to completely cover a two-dimensional plane.

Preferably, the edges extracted from the potential fields upward-continued for the predetermined heights correspond to structures at different depths, a composite structural framework map reflecting information at different depths is obtained by stacking the structural framework maps of the scales one upon the other.

Preferably, the heights are represented by using gradually changing colors to form the composite structural framework map.

Preferably, magnitudes of intensity values are represented by using gradually changing colors to form the composite structural intensity framework map.

According to another aspect of the present invention, the present invention provides a method for automatically extracting a structural framework, comprising the following steps:

preprocessing the magnetic data or gravity measure data from a study area to obtain total magnetic intensity (TMI) anomaly data or Bouguer gravity anomaly data;

gridding the TMI anomaly data or the Bouguer gravity anomaly data, and upward continuing the gridded TMI anomaly data or the Bouguer gravity anomaly data for a plurality of predetermined heights to obtain a plurality of gridded TMI anomaly data or Bouguer gravity anomaly data $T_h$ at the corresponding scales, wherein h represents height after upward continuation;

respectively calculating a tilt derivative $TDR_h$ of TMI anomaly data or Bouguer gravity anomaly data at each scale from the gridded TMI anomaly data or the Bouguer gravity anomaly data $T_h$ at the scale;

applying multidirectional edge detection based on a horizontal gradient respectively to the tilt derivative of the gridded TMI anomaly data or the Bouguer gravity anomaly data at each scale to obtain edges of source bodies of magnetic or gravity anomalies at the scales; and thinning the obtained edges of source bodies of magnetic or gravity anomalies at the scales respectively into single-pixel width with a morphological skeleton algorithm to obtain a plurality of structural framework maps at of the corresponding scales.

Preferably, the method further comprises stacking the plurality of structural framework maps at the corresponding scales to generate a composite structural framework map.

Preferably, the method further comprises corresponding the edges extracted from the gridded TMI anomaly data or Bouguer gravity anomaly data upward continued for the plurality of determined heights to structures at different depths, and stacking the obtained structural framework maps at the depths to obtain a composite structural framework map reflecting information at different cutting depths.

Preferably, the step of applying multidirectional edge detection based on a horizontal gradient respectively to the tilt derivative of the gridded TMI anomaly data or Bouguer gravity anomaly data at each scale comprises the following steps:

respectively defining directional derivatives of the tilt derivative $TDR_h$ at directions a and $$a + \frac{\pi}{2}$$

as:

$$D^\alpha TDR_h = \left(\cos\alpha \frac{\partial}{\partial x} + \sin\alpha \frac{\partial}{\partial y}\right) TDR_h$$

$$D^{\alpha+\frac{\pi}{2}} TDR_h = \left(\cos\left(\alpha + \frac{\pi}{2}\right)\frac{\partial}{\partial x} + \sin\left(\alpha + \frac{\pi}{2}\right)\frac{\partial}{\partial y}\right) TDR_h$$

wherein D represents a first-order derivative;

for the height h and the direction a, representing the horizontal gradient of the tilt derivative $TDR_h$ as:

$$\nabla TDR_h^\alpha = \begin{pmatrix} D^\alpha TDR_h \\ D^{\alpha+\frac{\pi}{2}} TDR_h \end{pmatrix}$$

wherein $\nabla$ is horizontal gradient;

defining modulus of horizontal gradient $\nabla TDR_h^\alpha$ as:

$$MTDR_h^\alpha = \sqrt{|D^\alpha TDR_h|^2 + |D^{\alpha+\frac{\pi}{2}} TDR_h|^2}$$

wherein argument of the horizontal gradient is:

$$ATDR_h^\alpha = \text{argument}(D^\alpha TDR_h + D^{\alpha+\frac{\pi}{2}} TDR_h),$$

and then, defining the points where modulus $MTDR_h^\alpha$ is local maximum along argument direction $ArDR_h^\alpha$ as edge points of source bodies of magnetic or gravity anomalies at the height h in direction a;

in each direction a, forming a curve by connecting the points with local maximum of modulus of horizontal gradient of tilt derivative $TDR_h$ in a direction perpendicular to the gradient to create an edge, and for the same height, calculating edges in a plurality of different directions a and taking a union of the edges as edges of source bodies of magnetic or gravity anomalies at the corresponding scales, wherein the plurality of different direction values a are respectively taken as $k\pi/(2^{n-1})$, wherein $k=0, 1, 2 \ldots (2^n-1)$ and n is an integer greater than or equal to 2, so as to completely cover a two-dimensional plane.

Preferably, the method further comprises respectively using modulus of horizontal gradient at each edge point on the structural framework map at each scale to represent a structural cover depth at the edge point in the structural framework map at the scale to obtain a plurality of structural framework maps representing structural cover depths at of the corresponding scales.

Preferably, the method further comprises stacking the plurality of structural framework maps representing structural cover depths at the corresponding scales one upon the other to generate a composite cover depth structural framework map.

Preferably, the method further comprises respectively calculating a three-dimensional analytic signal $AS_h$ based on the gridded TMI anomaly data or Bouguer gravity anomaly data $T_h$ at each scale to obtain the $AS_h$ value of each edge point to obtain a plurality of structural framework maps representing intensity of magnetism or density of edge points at the corresponding scales.

Preferably, the method further comprises stacking the plurality of structural framework maps representing intensity of magnetism or density of edge points at the corresponding scales one upon the other to generate a composite magnetic intensity structural framework map or a composite density intensity structural framework map.

Preferably, the method further comprises performing noise reduction processing to the tilt derivatives before edge detection.

Preferably, the method is applicable to automatic extraction of a magnetic structural framework in a low-latitude area; preferably, the method is applicable to magnetic measure data of an area with a magnetic inclination in range of ±30°; and more preferably, the method is applicable to magnetic measure data of an area with a magnetic inclination in range of ±20°.

According to the methods provided by the present invention, information about gravity-magnetic anomalies at different depths in a study area, information about distribution of structural frameworks representing geological structures at different depths and information about change intensity of magnetism and density of structural frameworks at different depths can be obtained, identification and qualitative interpretation of geological structures controlling the formation of ore deposits are achieved, potential ore deposit types and attributes of structures controlling the formation of ore deposits are determined according to priori knowledge about the study area, screening is performed to different types of structural frameworks and thus localization of targets of metal ore deposits is achieved.

The method for automatically extracting structural frameworks from magnetic measure data in low-latitude areas in the present invention solves the problem that it is difficult to accurately obtain structure information by using magnetic measure data in low-latitude areas in the prior art. As compared with the existing grid images or contour maps, the structural framework maps obtained according to the present invention intuitively represent structural information such as cutting depth, cover depth, primary and secondary relation, cutting relation and magnetic intensity which have an important significance to geological interpretation and mineral exploration.

The method for automatically extracting the magnetic structural framework in the low-latitude area provided by the present invention is also applicable to automatic extraction of magnetic structural frameworks in high-latitude areas, and is also applicable to automatic extraction of structural frameworks of gravity potential fields.

By adopting the methods according to the present invention, the range of areas with structural frameworks which are analyzed and obtained by means of magnetic method is extended, the accuracy of automatic extraction of structural frameworks is improved, identification and qualitative interpretation of geological structures controlling the formation of ore deposits can be achieved, potential ore deposit types and attributes of structures controlling the formation of ore deposits are determined according to priori knowledge about the study area, screening is performed to different types of structural frameworks and thus localization of targets of metal ore deposits is achieved.

BRIEF DESCRIPTION OF THE DRAWINGS

From the following description of exemplary embodiments with reference to the drawings, further features of the present invention will become obvious. The drawings described here are used for providing further understanding about the invention and constitute a part of the application. Schematic embodiments of the invention and the description thereof are used for explaining the invention instead of improperly limiting the invention. In the drawings.

DETAILED DESCRIPTION

In order to better understand the technical solution of the present invention, the implementation modes of the present invention will be further described below with reference to the drawings in combination with the embodiments, which, however, should not be considered as limitations to the present invention.

Embodiment 1

Figure 1:
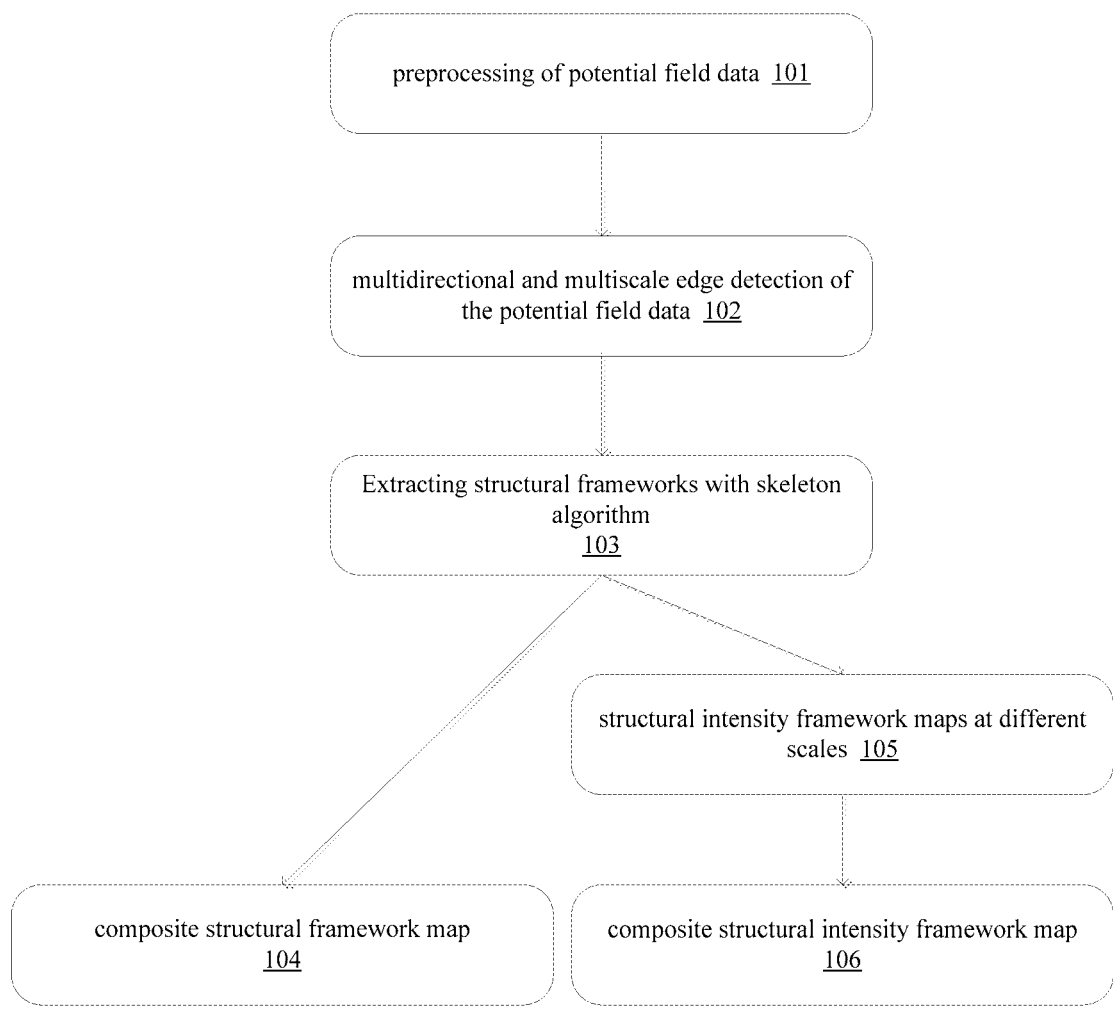
FIG. 1 illustrates a flowchart of a method for automatically extracting a structural framework from potential field data according to Embodiment 1 of the present invention.

FIG. 1 illustrates a flowchart of a method for automatically extracting a structural framework from potential field data according to Embodiment 1 of the present invention. As illustrated in FIG. 1, the method comprises the following steps:

In step 101, preprocessing is performed to the measured gravity potential field data or magnetic potential field data.

Reduction-to-pole calculation is performed to the magnetic data to obtain the reduction-to-pole magnetic anomalies or pseudo-gravity transformation is applied to obtain pseudo-gravity anomalies.

Preprocessing is performed to the gravity data to obtain Bouguer gravity anomalies.

In step 102, a potential field multidirectional and multiscale edge detecting method is applied to the preprocessed gravity potential field data or magnetic potential field data to obtain edges at a plurality of scales.

The potential field multidirectional and multiscale edge detecting method comprises steps of upward continuing the preprocessed gravity potential field data or magnetic potential field data for a plurality of predetermined heights to obtain a plurality of potential field data at the corresponding scales, and applying a multidirectional edge detection respectively to the potential field data at each scale to obtain a potential field edge at the scale.

The method for applying the multidirectional edge detection respectively to the potential field data at each scale comprises the following steps:

A gravity anomaly or magnetic anomaly at Earth surface point (x, y) at height of zero is defined as $f_0(x, y)$.

Let scale $s=z/z_0$, and $z>z_0$, $z_0$ representing measurement height and z representing the upward continued height.

A smoothing function for scales is defined as:

$$\theta_s(x,y) = s^{-2}\theta(x/s + y/s) = \gamma_{sz_0}(x,y),$$

wherein $$\gamma_{sz_0}(x, y) = \frac{1}{2\pi} k(x, y, sz_0),$$

k(x, y, z) is Green's function.

A wavelet function in direction a is defined as:

$$\psi^a = \left(\cos\alpha \frac{\partial}{\partial x} + \sin\alpha \frac{\partial}{\partial y}\right) \theta(x, y) = D^a \theta(x, y),$$

wherein D represents a first-order derivative.

For the scale s and the location (x, y), the wavelet transform of the gravity anomaly or magnetic anomaly $f_0(x, y)$ in direction a is defined as:

$$W^a[f_0](x, y, s) = [f_0 * \psi_s^a](x, y)$$
$$= f_0 * (sD^a \theta_s)$$
$$= sD^a[f_0 * \theta_s]$$
$$= sD^a[f_0 * \gamma_{sz_0}]$$

wherein * represents convolution operation, according to a potential field upward continuation formula, it is known that:

$$f_z(x,y) = f_0(x,y) * \gamma_{sz_0}(x,y), \text{ and}$$

$f_z(x, y)$ is a gravity anomaly or magnetic anomaly via upward continuation of $f_0(x, y)$ from height zero to height $z=sz_0$ and is obtained by upward continuing the gravity anomaly or magnetic anomaly $f_{z0}(x, y)$ measured at measurement height $z_0$ for height $z-z_0$, hence, $$w^a[f_0](x,y,s) = sD^a f_z(x,y)$$
$$= (z/z_0)D^a f_z(x,y);$$

Similarly, for the scale s and the location (x, y), wavelet transform of the gravity anomaly or magnetic anomaly $f_0(x, y)$ in direction $$a + \frac{\pi}{2}$$

is defined as:

$$W^{a+\frac{\pi}{2}}[f_0](x, y, s) = (z/z_0)D^{a+\frac{\pi}{2}} f_z(x, y).$$

Gradient may be used to represent two-dimensional wavelet transform of $f_0(x, y)$ as:

$$W[f_0](x, y, s, \alpha) = \begin{pmatrix} W^a[f_0](x, y, s) \\ W^{a+\frac{\pi}{2}}[f_0](x, y, s) \end{pmatrix} = (z/z_0) \begin{pmatrix} D^a f_z(x, y) \\ D^{a+\frac{\pi}{2}} f_z(x, y) \end{pmatrix}$$

$$W[f_0](x, y, s, \alpha) = (z/z_0)\nabla f_z(x, y, \alpha)$$

wherein $\nabla$ is the two-dimensional gradient.

The above equation establishes a relation between the horizontal gradient of the gravity anomaly or magnetic anomaly $f_z(x, y)$ at any height z $(z>z_0)$ and the two-dimensional directional wavelet transform of the gravity anomaly or magnetic anomaly $f_0(x, y)$ at height zero.

For location (x, y), scale s and direction a, two-dimensional wavelet transform $W[f_0](x, y, s, \alpha)$ of $f_0(x, y)$ is in direct proportion to gradient $\nabla f_z(x, y, \alpha)$ of $f_z(x, y)$, and two-dimensional wavelet transform $W[f_0](x, y, s, \alpha)$ of $f_0(x, y)$ can be represented by the gradient $\nabla f_z(x, y, \alpha)$ of $f_z(x, y)$.

For height z after upward continuation, a modulus of a gradient $\nabla f_z(x, y, \alpha)$ is defined as:

$$M[f_z](x, y, \alpha) = \sqrt{|D^a f_z(x, y)|^2 + \left|D^{a+\frac{\pi}{2}} f_z(x, y)\right|^2}.$$

wherein corresponding argument of the gradient along the horizontal direction is:

$$Af_z(x, y, \alpha) = \text{argument}\left(D^a f_z(x, y) + D^{a+\frac{\pi}{2}} f_z(x, y)\right),$$

and defining the point where the modulus $M[f_z](x, y, \alpha)$ is local maximum along the argument direction $Af_z(x, y, \alpha)$ as an edge point.

For each height z after upward continuation, different directions a are selected to calculate, information about edges in different directions may be highlighted. In order to achieve complete coverage of a two-dimensional plane, the direction value a may be taken as $k\pi/(2^{n-1})$, wherein k=0, 1, 2 ... $(2^n-1)$ and n is an integer greater than or equal to 2. In each direction, a curve is formed by connecting the points with local maximum of gradient modulus in a direction perpendicular to the gradient to create an edge. For the same height after the upward continuation, edges are calculated in directions completely covering the two-dimensional plane, a union of all the calculated edges is taken to obtain the edge at the scale.

By performing the above calculation to the potential field data at each scale, multidirectional edge detection of the potential field data at each scale can be achieved.

In step 103, the obtained edges at each scale are thinned into single-pixel width with a morphological skeleton algorithm to obtain a framework map at each scale.

For the obtained edge images, edges are thinned into single-pixel width by using an algorithm for thinning the framework in Thinning Methodologies—A Comprehensive Survey, Lam, L., Seong-Whan Lee and Ching Y. Suen, IEEE Transactions on Pattern Analysis and Machine Intelligence, v. 14, no. 9, September 1992.

By thinning the obtained edges, the actual geographical range corresponding to the edges and intersections of the edges in different directions is significantly reduced compared with the prior art, such that the obtained potential field structural framework is closer to the feature of the actual geological mapping identified structure. On one hand, map information is clear and the readability is enhanced. On the other hand, the geological interpretation is also facilitated.

In step 104, the obtained structural frameworks at all scales are stacked one upon the other to generate a composite structural framework map.

Edges at all scales extracted from the potential field data after upward continuation for different heights are stacked one upon the other to obtain a composite structural framework map of the potential field of the study area.

Corresponding the different heights after upward continuation of the potential field to different depths of source bodies (see A case for upward continuation as a standard separation filter for potential-field maps, Jacobsen, B. H., Geophysics, v. 52 no. 8, 1987), may obtain structures corresponding to different depths of the Earth. The frameworks at corresponding different scales or different depths are rendered with gradually changing colors and structural frameworks at all scales rendered with different gradually changing colors are stacking one upon the other to highlight information about structures at different depths. By stacking in such a way, a composite structural framework map reflecting information at different depths is obtained.

In step 105, the gradient modulus of each edge point on the framework at each scale is used for reflecting edge intensity.

For different directions a, the gradient modulus M $[f_z](x, y, \alpha)$ of each edge point does not change and is a fixed value. The gradient modulus of the edge point is taken as a structural intensity value at this edge point to establish structural intensity framework maps at different scales or different depths.

In step 106, the structural intensity framework maps at the plurality of scales are stacked one upon the other to generate a composite structural intensity framework map.

By rendering the intensity values of edges at the scales or depths with different gradually changing colors and stacking, information of changing intensity of magnetism and density can be highlighted.

Example 1

The technical solution of the present invention will be explained by taking automatic extraction of a potential field structural framework from aeromagnetic data of West Yunnan as an example.

Firstly, reduction-to-pole processing is performed in blocks to the aeromagnetic data, the processed data are spliced to form a potential field grid file and the size of the grid is 500 m. The aeromagnetic data in this example is historical one measured and collected in the past in many times, and the measurement height is in range of 800-1200 m.

Then, upward continuation processing is respectively performed to the spliced potential field grid file to obtain potential field data after upward continuation, the upward continuing heights are 1000 m, 1500 m, 2000 m, 2500 m, 3000 m, 4000 m, 5000 m, 10000 m, 15000 m, 20000 m, 25000 m and 30000 m, respectively, edge detections in thirty-two directions are applied at each upward continued height, each direction a is taken a value as $k\pi/(2^{n-1})$, wherein $k=0, 1, 2, \ldots, (2^n-1)$ and $n=5$, and thereby edges at each scale are obtained.

Then, thinning processing is performed to the resulted edges at each scale with a skeleton algorithm to obtain a structural framework map at each scale.

Figure 2:
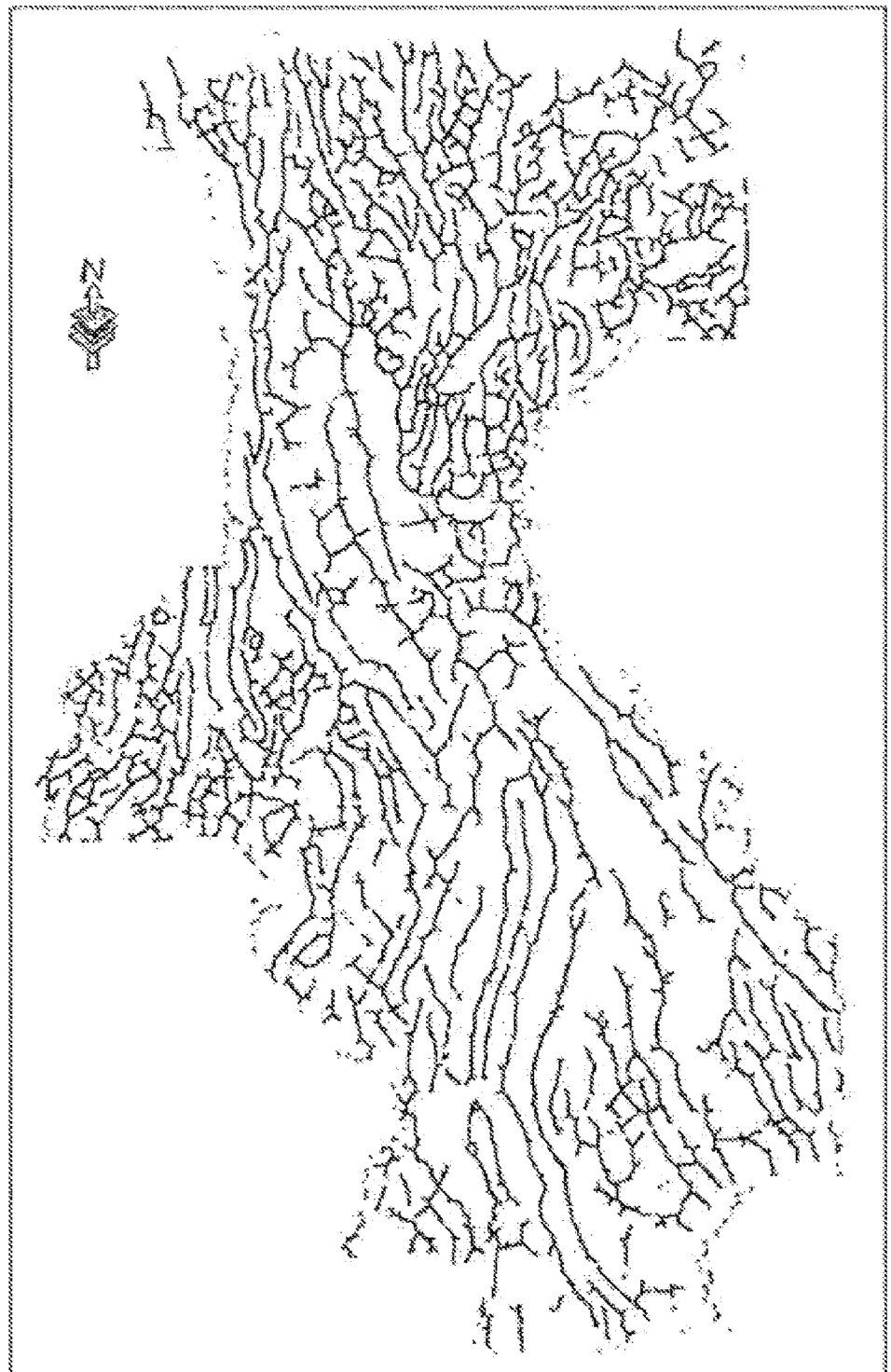
FIG. 2 illustrates a single-pixel width structural framework map according to Example 1 of the present invention.

FIG. 2 illustrates a single-pixel width structural framework extracted at a corresponding scale to the height upward continued for 5000 m with the edges thinned with the skeleton algorithm. It can be seen that the single-pixel width potential field structural framework automatically extracted by the method of the present invention is closer to the feature of the actual geological mapping identified structure, and thereby the geological interpretation is facilitated. In addition, the map information is clearer and the superposition analysis of the frameworks at different scales is facilitated.

Figure 3:
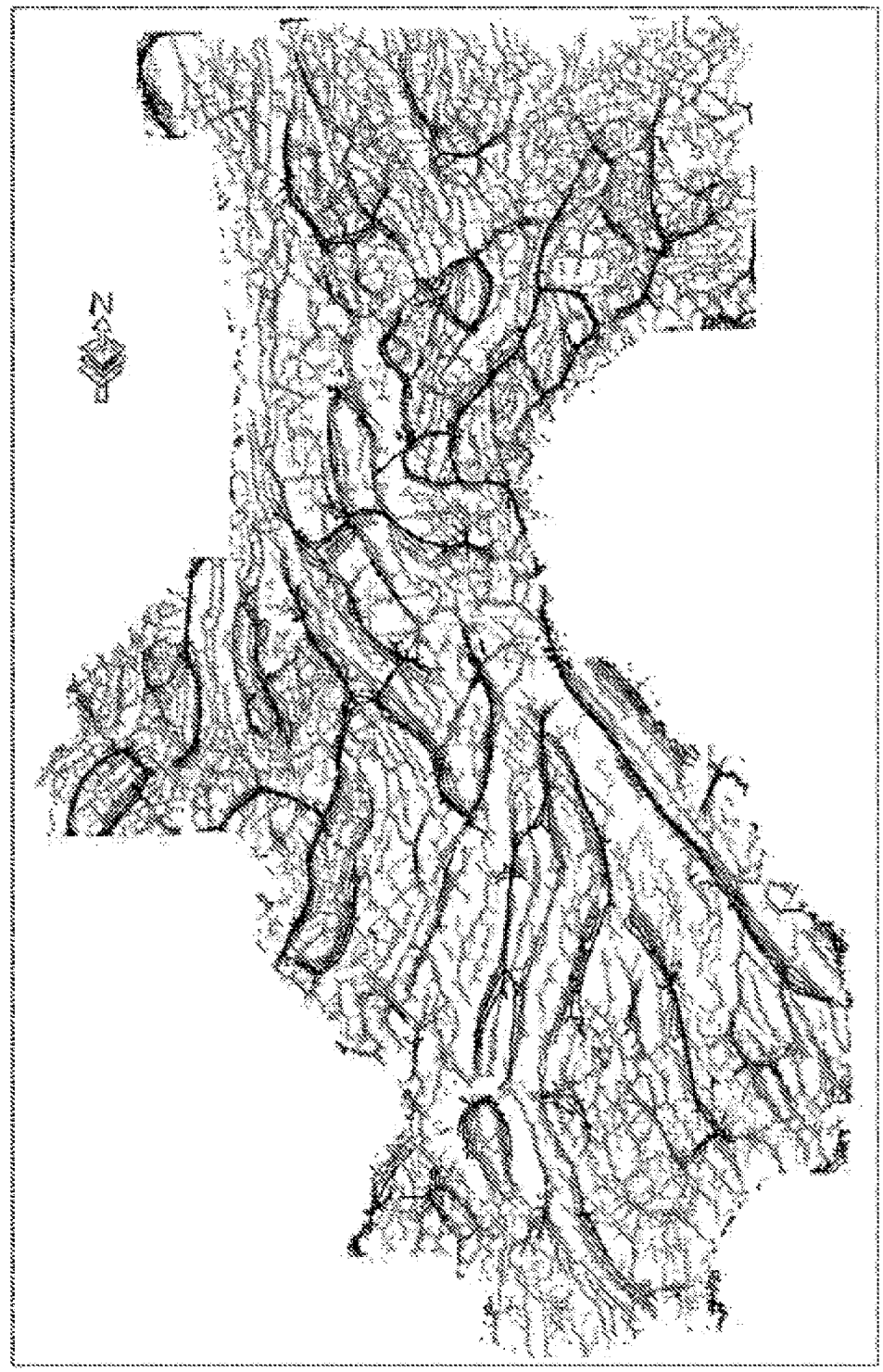
FIG. 3 illustrates a composite structural framework map according to Example 1 of the present invention.

FIG. 3 illustrates a composite structural framework map formed by rendering with gradually changing colors and stacking the frameworks at all scales obtained by edge detection in thirty-two directions to the potential field data via upward continuation for heights of 1000 m, 1500, 2000 m, 2500 m, 3000 m, 4000 m, 5000 m, 10000 m, 15000 m, 20000 m, 25000 m and 30000 m, respectively. Corresponding the heights via upward continuation to respective depths of sources, the composite structural framework map may be used for representing information about structural frameworks at different depths of the study area. Using colors gradually changing from grey white to black to represent upward continuation heights from low to high or depths from shallow to deep, the composite structural framework map reflects information about structures at different depths.

Figure 4:
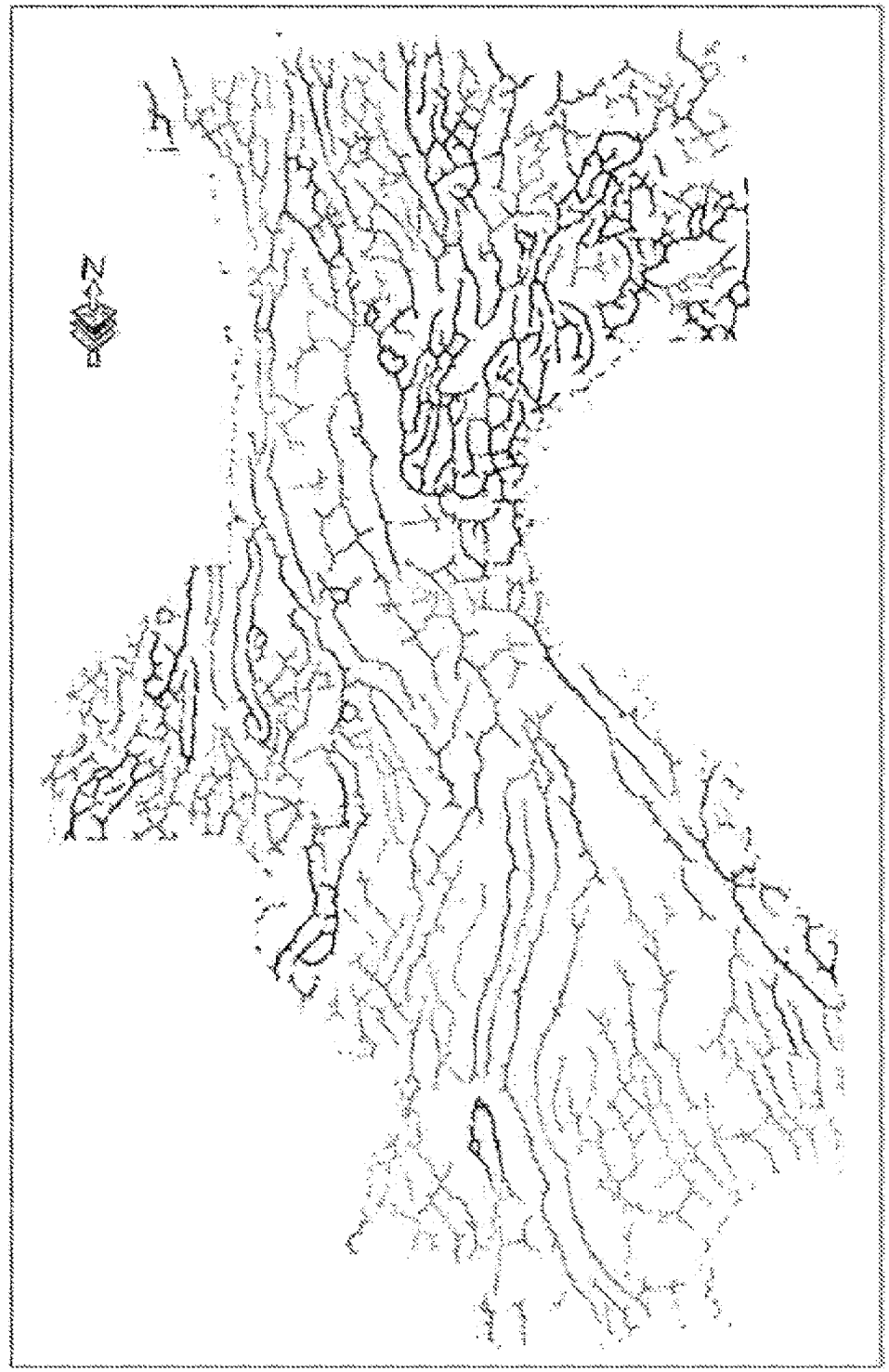
FIG. 4 illustrates a structural intensity framework map according to Example 1 of the present invention.

FIG. 4 illustrates structural intensity reflected by gradient modulus at edge points of a framework obtained after upward continuation for a height of 5000 m. Colors changing from grey white to black reflect that structural intensity values represented by gradient modulus increase gradually. This map reflects structural intensity change corresponding to one scale.

Figure 5:
FIG. 5 illustrates a composite structural intensity framework map according to Example 1 of the present invention.

FIG. 5 illustrates a composite structural intensity framework map obtained by stacking the edge intensities obtained by upward continuing the potential field data for heights of 1000 m, 1500 m, 2000 m, 2500 m, 3000 m, 4000 m, 5000 m, 10000 m, 15000 m, 20000 m, 25000 m and 30000 m. It can be seen from the mat, at different scales, major structural belts present high structural intensity and the corresponding magnetic anomalies change obviously, which indicates that major structural belts all are abrupt change belts of magnetic anomalies, the corresponding depths are very deep, and reflects that the structural belts control magmatic ore-forming process at deep depth.

Furthermore, in FIG. 3 and FIG. 5, structural framework maps with depth and intensity information can clearly reflect primary structures of deep depth and long extension in the area, secondary structures of shallow depth and short extension, as well as mutual cutting relations. Therefore, the structural framework map obtained by the method according to the present invention can help one skilled in the art to recognize the structural framework of the surveyed area.

By comparing FIG. 3 and FIG. 5 with the surface mapping geological structure of this area, the spatial location and range fit very well, which indicates that the automatic extraction method according to the present invention is accurate and effective. In addition, as compared with the surface mapping geological structure of this area, structural information about three-dimensional extension, intensity and structure is incorporated in FIG. 3 and FIG. 5 of the present invention, which may help to identify the hidden structural belts.

Area near the structural belts with deep depths and high structural intensity, intersection parts of structures of different directions as well as the turned and curved parts of the structural belts are important locations where potential metal ore deposits may be discovered. With the method according to the present invention, structural framework maps with depth and intensity information can be rapidly and accurately extracted from aeromagnetic data and gravity data, and help the explorers to accurately and rapidly discover potential metal ore deposits.

Embodiment 2

A flowchart of a method for automatically extracting a magnetic structural framework of a low-latitude area according to Embodiment 2 of the present invention will be specially described below by taking magnetic measure data as an example. One skilled in the art can understand that the method provided by the present invention is not limited to be applicable to automatic extraction of structural frameworks from magnetic survey data and is also applicable to automatic extraction of structural frameworks from gravity measure data.

Figure 6:
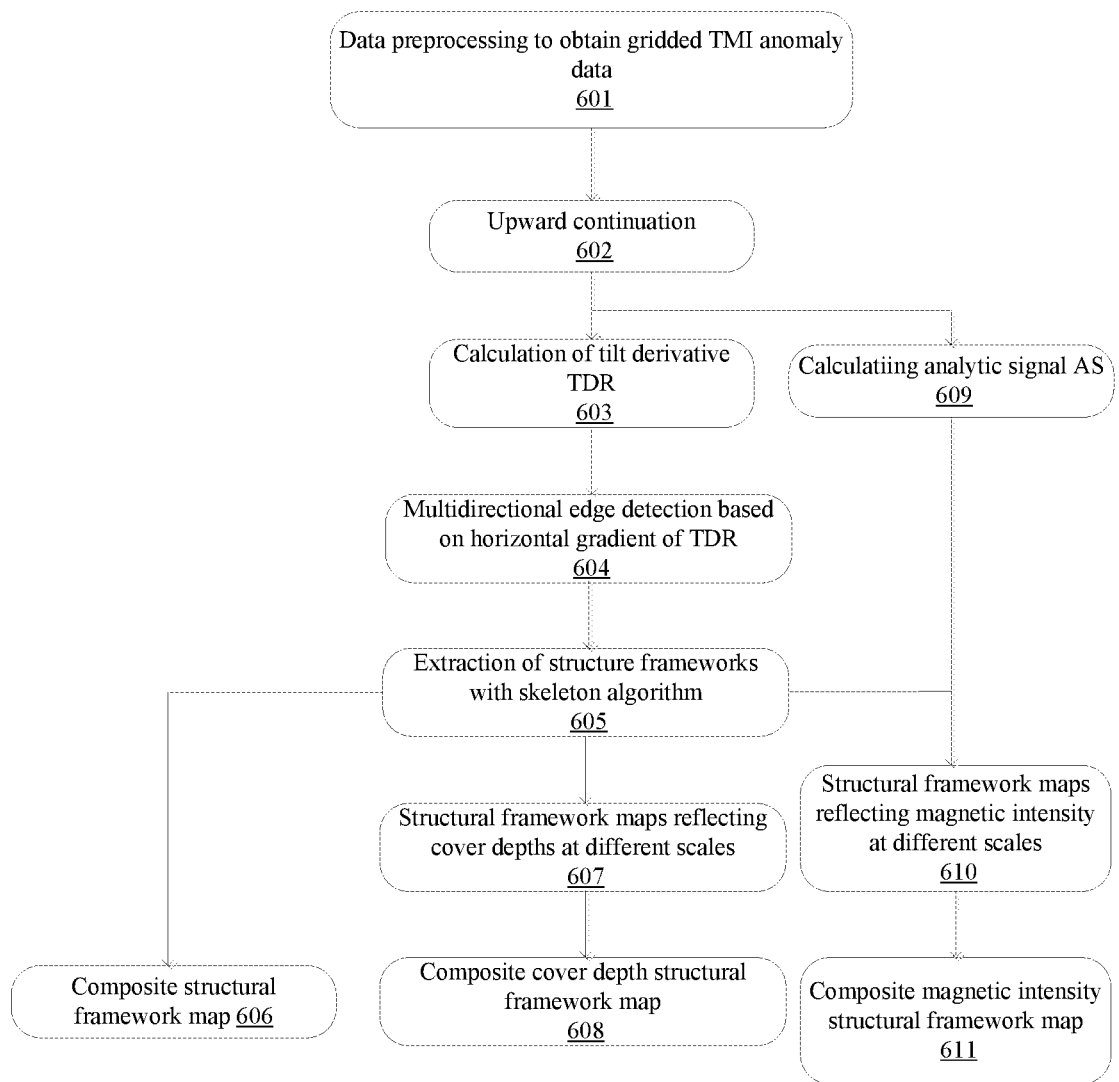
FIG. 6 illustrates a flowchart of a method for automatically extracting a magnetic structural framework in a low-latitude area according to Embodiment 2 of the present invention.

FIG. 6 illustrates a flowchart of a method for automatically extracting a magnetic structural framework from a low-latitude area according to the present invention. As illustrated in FIG. 6, the method comprises the following steps:

In step 601, preprocessing is performed to measurement values obtained through magnetic survey, and Normal Geomagnetic Field (IGRF International Geomagnetic Reference Field) correction is performed to obtain Total Magnetic Intensity (TMI) anomaly data.

Gridding is performed to TMI anomaly data, and the grid size is taken as ⅛ to ¼ of spacing of the survey lines or a minimum point-to-point distance.

In step 602, the gridded TMI anomaly data T are upward continued for a plurality of predetermined heights to obtain a plurality of gridded TMI anomaly data $T_h$ at the corresponding scales, wherein h represents height after upward continuation.

In step 603, a tilt derivative $TDR_h$ of TMI anomaly data at each scale is calculated by using the gridded TMI anomaly data $T_h$ at the corresponding scale according to the following formula:

$$TDR_h = \arctan\left(\frac{VDR_h}{THDR_h}\right),$$

wherein $VDR_h$ and $THDR_h$ respectively represent vertical first-order derivative and total horizontal derivative of gridded TMI anomaly data $T_h$:

$$VDR_h = \frac{\partial T_h}{\partial x},$$

$$THDR_h = \sqrt{\left(\frac{\partial T_h}{\partial x}\right)^2 + \left(\frac{\partial T_h}{\partial y}\right)^2}.$$

In step 604, multidirectional edge detection based on a horizontal gradient is applied respectively to the tilt derivative $TDR_h$ at each scale.

Directional derivatives of the tilt derivative $TDR_h$ in directions a and $$a + \frac{\pi}{2}$$

are respectively defined as:

$$D^\alpha TDR_h = \left(\cos\alpha \frac{\partial}{\partial x} + \sin\alpha \frac{\partial}{\partial y}\right) TDR_h$$

$$D^{\alpha+\frac{\pi}{2}} TDR_h \left(\cos\left(\alpha + \frac{\pi}{2}\right)\frac{\partial}{\partial x} + \sin\left(\alpha + \frac{\pi}{2}\right)\frac{\partial}{\partial y}\right) TDR_h$$

wherein D represents a first-order derivative.

For height h and direction a, the horizontal gradient of the tilt derivative $TDR_h$ is represented as:

$$\nabla TDR_h^\alpha = \begin{pmatrix} D^\alpha TDR_h \\ D^{\alpha+\frac{\pi}{2}} TDR_h \end{pmatrix}$$

wherein $\nabla$ is horizontal gradient.
A modulus of a horizontal gradient $\nabla TDR_h^\alpha$ is defined as:

$$MTD_h^\alpha = \sqrt{|D^\alpha TDR_h|^2 + |D^{\alpha+\frac{\pi}{2}} TDR_h|^2}$$

wherein a corresponding argument of the gradient is:

$$ATDR_h^\alpha = \text{argument}(D^\alpha TDR_h + D^{\alpha+\frac{\pi}{2}} TDR_h),$$

total horizontal derivative of tilt derivatives (abbr.: TDR_THDR) of the TMI anomaly data is:

$$TDR\_THDR_h = MTDR_h^\alpha, \text{ and}$$

the amplitude of the modulus $MTDR_h^\alpha$ is not related to the magnitude of the magnetic inclination.

Thus, the point where the modulus $MTDR_h^\alpha$ is local maximum along the argument direction $ATDR_h^\alpha$ are an edge point of source bodies of magnetic anomalies at height h in direction a.

In each direction a, the points with local maximum of gradient modulus are connected in direction perpendicular to the gradient to obtain a curve to create an edge.

Edges in a plurality of different directions a are calculated at the same height h and a union of all the created edges is taken to obtain edges of source bodies of magnetic anomalies at corresponding scales.

In order to achieve complete coverage of a two-dimensional plane, the different direction values a are respectively taken as $k\pi/(2^{n-1})$, wherein $k=0, 1, 2 \ldots (2^n-1)$ and n is an integer greater than or equal to 2.

The TDR calculation performed to the gridded TMI anomaly data may introduce noise into calculation results, and the subsequent multidirectional edge detection is very sensitive to the noise. In order to prevent noise from influencing multidirectional edge detection, preferably, noise reduction processing such as Gaussian filtering is performed to the $TDR_h$ data with high noise before the multidirectional edge detection is performed.

Since the total horizontal derivatives of the tilt derivatives of the TMI anomaly data are independent of the magnetic inclination, the calculation results are not related to the magnitude of the magnetic inclination, the edges of source bodies of magnetic anomalies obtained by the above steps are not influenced by the magnetic inclination, i.e., are not influenced by latitude locations of the area to be analyzed, the structural framework of the low-latitude area can be accurately represented.

In step 605, the calculated edges at each scale are respectively thinned into single-pixel width with a morphological skeleton algorithm to obtain structural framework maps at a plurality of scales.

For the calculated edge images, edges are thinned into single-pixel width by using an algorithm for thinning the framework in Thinning Methodologies-A Comprehensive Survey, Lam, L., Seong-Whan Lee and Ching Y. Suen, IEEE Transactions on Pattern Analysis and Machine Intelligence, v. 14, no. 9, September 1992.

By thinning the obtained edges, the actual geographical range corresponding to the edges and intersections of edges in different directions is significantly reduced compared with the prior art, such that the obtained structural framework is closer to the feature of the actual geological mapping identified structure. On one hand, map information is clear and the readability is enhanced. On the other hand, the geological interpretation is also facilitated.

In step 606, the obtained structural framework maps at all scales are stacked one upon the other to generate a composite structural framework map.

The obtained structural framework maps at all scales are stacked one upon the other to generate a composite structural framework map reflecting information at different depths, and lateral deviation of edges at different scales on the map reflects information about attitude of structural frameworks.

Corresponding the edges extracted from the gridded TMI anomaly data after upward continuation for different heights to the structures at different depths, the depth being half of height after upward continuation (see A case for upward continuation as a standard separation filter for potential-field maps, Jacobsen, B. H., Geophysics, v. 52 no. 8, 1987), may obtain structural framework maps representing different cutting depths. Stacking the obtained structural framework maps at all depths one upon the other, may obtain a composite structural framework map reflecting information at different cutting depths.

In step 607, a modulus of a horizontal gradient of $TDR_h$ at each edge point on the structural framework map at each scale is used to represent a structural cover depth to obtain structural framework maps representing structural cover depths at a plurality of scales.

For different directions a, the modulus $MTDR_h^\alpha$ of the horizontal gradient at each edge point does not change and is a fixed value.

Due to the attribute of the arctan value of the trigonometric function, no matter how great the amplitudes of $VDR_h$ and $THDR_h$ are, the amplitude of $TDR_h$ is limited between $-\pi/2$ and $+\pi/2$. Therefore, the modulus $MTDR_h^\alpha$ of the horizontal gradient at each edge point has little correlation with the amplitude of TMI anomalies, the value reflects the cover depths of source bodies, the magnitude of the value is in inverse proportion to the cover depth, and the bigger the value is, the shallower the cover depth is (see New Insights into Magnetic Derivatives for Structural Mapping, Bruno Verduzco, et al., The Leading Edge, v. 23 no. 2, 2004).

The structural cover depth reflected by the modulus of the horizontal gradient of the tilt derivative $TDR_h$ represents the thickness of the cover layer above the structural belt, and different depths corresponding to upward continuation to a plurality of predetermined heights reflect the cutting depth of the structural belt, which represents the downward extension depth of the structural belt.

The gradient modulus $MTDR_h^\alpha$ of each edge point is used for representing the edge relative cover depth of the edge point at the scale, to establish structural framework maps reflecting structural relative cover depth at different scales or depths. Changes in the values of the gradient modulus of the same structural belt reflect cover depths of different parts of the structural belt.

In step 608, the structural framework maps representing cover depths at the plurality of scales are stacked one upon the other to obtain a composite cover depth structural framework map.

Modulus values of horizontal gradient of $TDR_h$ of edge points at scales or depths are stacked one upon the other and rendered with different gradually changing colors to highlight information about cover depth changes of structural frameworks of different cutting depth ranges.

In step 609, a three-dimensional analytic signal $AS_h$ is calculated for the gridded TMI anomaly data $T_h$ at each height according to the following formula:

$$AS_h = \sqrt{\left(\frac{\partial T_h}{\partial x}\right)^2 + \left(\frac{\partial T_h}{\partial y}\right)^2 + \left(\frac{\partial T_h}{\partial z}\right)^2}$$

The amplitude of the resulted analytic signal $AS_h$ has a strong correlation with the amplitude of TMI anomalies, but is independent of the magnitude of the magnetic inclination, and may be used for indicating locations and magnetic intensity of source bodies of magnetic anomalies.

In step 610, the $AS_h$ value of each edge point on the framework at each scale is used for indicating the magnetic intensity of the structure.

Without considering the cover depths of source bodies of magnetic anomalies, the amplitude of the three-dimensional analytic signal $AS_h$ indicates magnetic intensity of sources of magnetic anomalies, and structures with strong magnetism usually have a close relation with ore formation.

In step 611, the magnetic intensity structural framework maps at the plurality of scales are stacked one upon the other to generate a composite magnetic intensity structural framework map.

$AS_h$ values of edge points at the scales or depths are rendered with gradually changing colors and stacked one upon the other to highlight information about magnetic intensity changes of structural frameworks in range of different depths.

Example 2

The technical solution of the present invention will be explained below by taking automatic extraction of a magnetic structural framework from high-precision aeromagnetic data of Guyana Shield in South America in low-latitude area as an example.

Survey scale of aeromagnetic data used in this example is 1:25000 and measurement height is in range of 70-120 m.

Firstly, preprocessing is performed to the measurement values obtained through aeromagnetic survey of the study area, Normal Geomagnetic Field (IGRF International Geomagnetic Reference Field) correction is performed to obtain Total Magnetic Intensity (TMI) anomaly data, and gridding is performed to the TMI anomaly data, wherein the grid size is about 10 m.

Then, upward continuation processing is respectively performed to the gridded TMI anomaly data to obtain gridded TMI anomaly data $T_h$ at a plurality of scales, wherein upward continuation heights are 100 m, 200 m, 300 m, 400 m and 500 m, respectively.

TDR calculation is performed to the gridded TMI anomaly data $T_h$ at each scale.

For each upward continuation height, multidirectional edge detection based on a horizontal gradient is respectively performed to the calculated TDR at each height after upward continuation. Edge detection in sixty-four directions is performed to each TDR calculation result and different direction values a are taken as $k\pi/(2^{n-1})$ respectively, wherein k=0, 1, 2 ... ($2^n$−1) and n=6, so as to obtain a edges at each scale.

Then, thinning processing is performed to the resulted edges at each scale with the skeleton algorithm to obtain a structural framework map at each scale.

Figure 7:
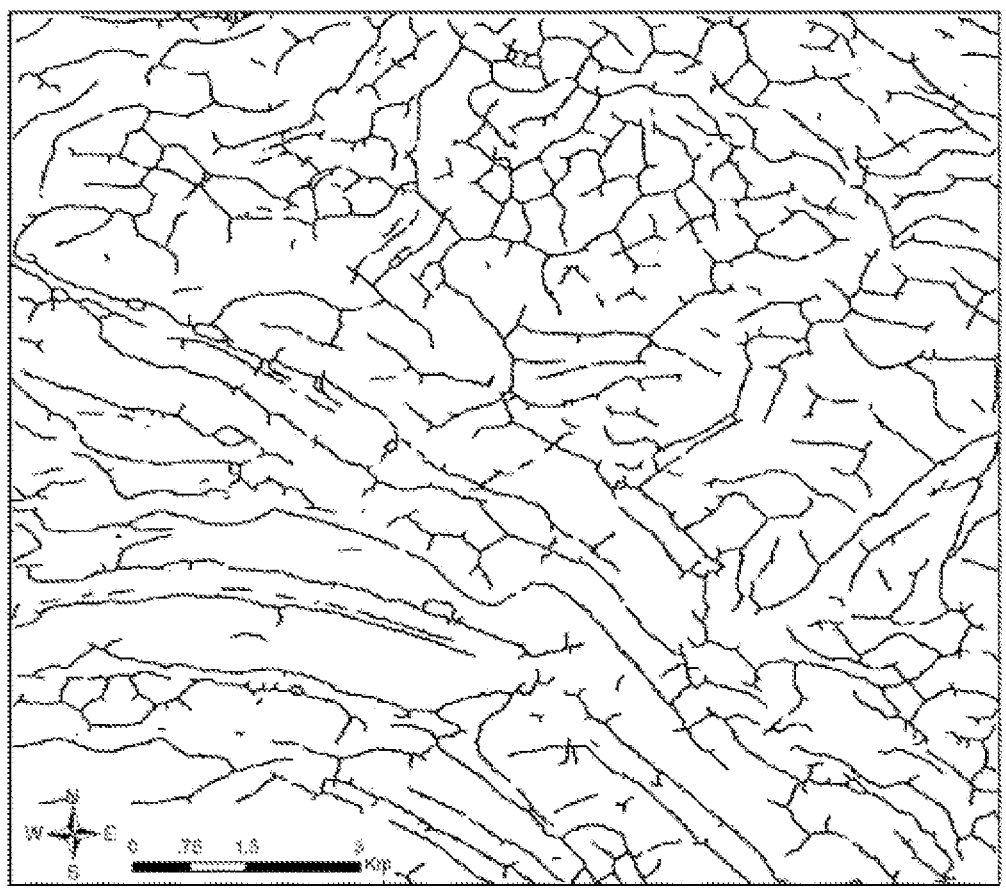
FIG. 7 illustrates a single-pixel width structural framework map according to Example 2 of the present invention.

FIG. 7 illustrates a single-pixel width magnetic structural framework at a corresponding scale obtained by extracting from the gridded TMI anomaly data after upward continuation for a height of 300 m and the edges are thinned with the skeleton algorithm. It can be seen that the single-pixel width structural framework automatically extracted by the method of the present invention is closer to the feature of the actual geological mapping identified structure, and thereby the geological interpretation is facilitated. In addition, the map information is clearer and the superposition analysis of the structural frameworks at different scales is facilitated.

Figure 8:
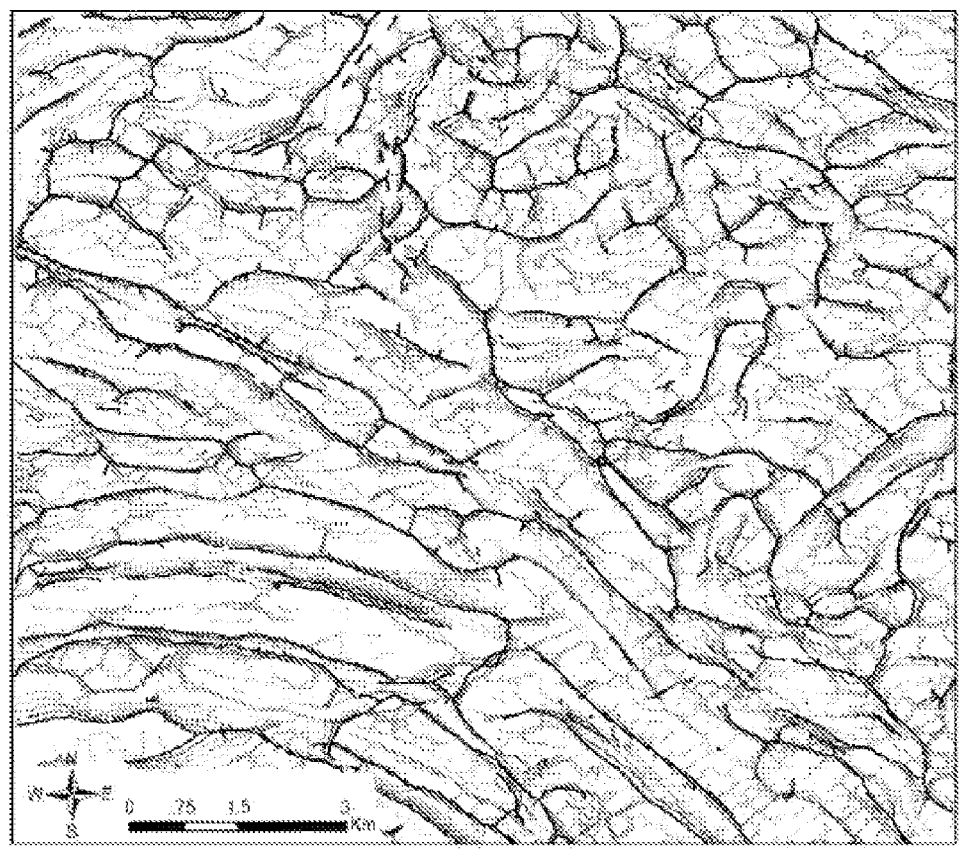
FIG. 8 illustrates a composite structural framework map according to Example 2 of the present invention.

FIG. 8 illustrates a composite structural framework map formed by rendering with gradually changing colors and stacking the frameworks at all scales obtained by edge detection in sixty-four directions to the gridded TMI anomaly data after upward continuation for heights of 100 m, 200 m, 300 m, 400 m and 500 m. Corresponding the heights via upward continuation to the depths of source bodies, the composite structural framework map may be used for representing information about structural frameworks at different depths of the study area. Using colors gradually changing from grey white to black to represent upward continued heights from low to high or depths from shallow to deep, and the composite structural framework map reflects information about structures at different cutting depths.

Figure 9:
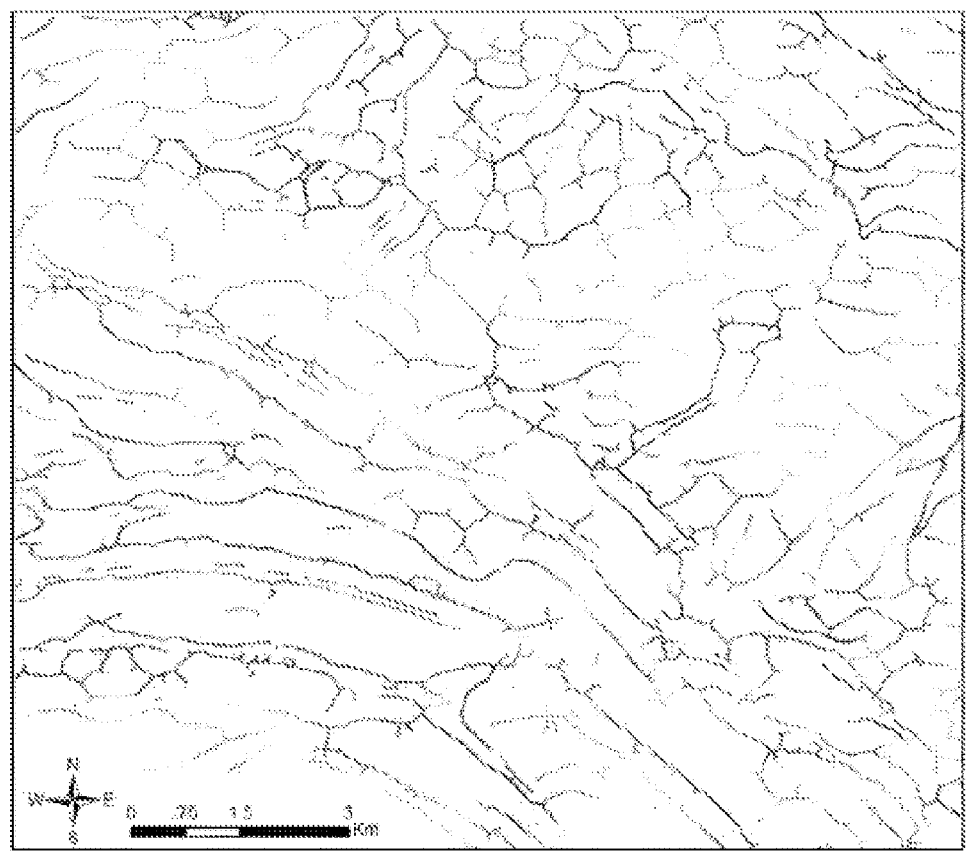
FIG. 9 illustrates a structural framework map reflecting cover depth according to Example 2 of the present invention.

Then, the gradient modulus of $TDR_h$ at each edge point on a framework at each scale is calculated for representing structural cover depth. FIG. 9 illustrates structural cover depths represented by the gradient modulus at edge points of a framework upward continued for an height of 300 m, and colors gradually changing from grey white to black reflect that structural cover depths represented by modulus of a horizontal gradient gradually decrease. This map reflects structural cover depth changes at a corresponding scale.

Figure 10:
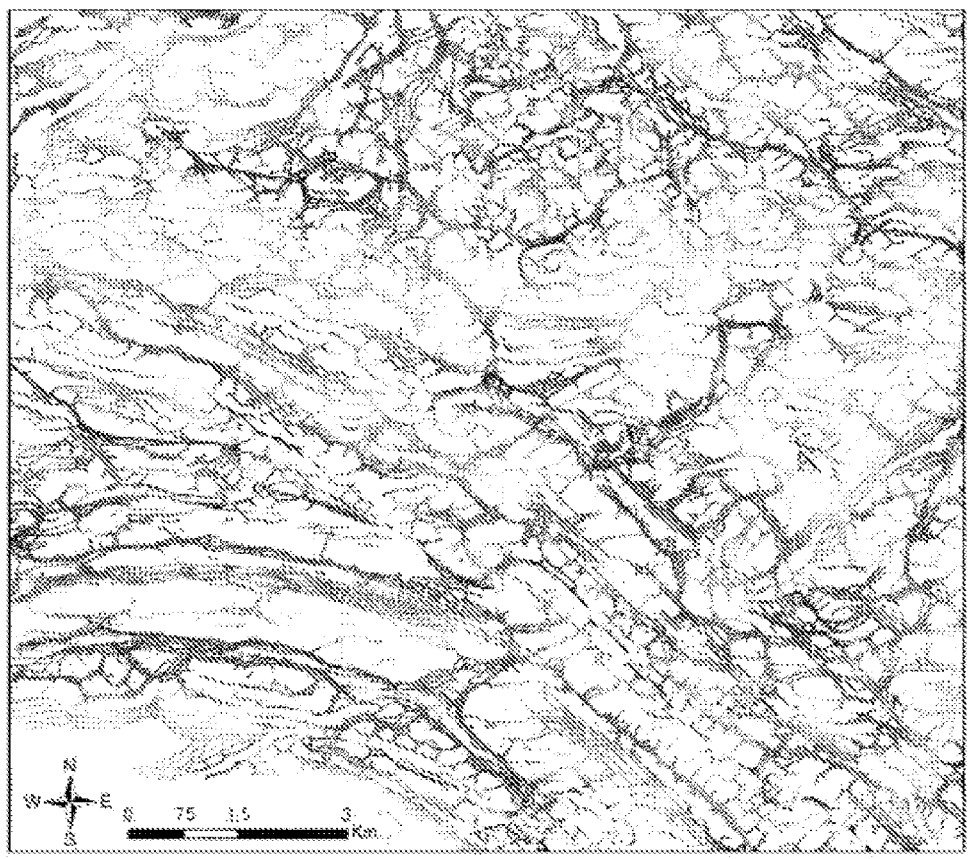
FIG. 10 illustrates a composite cover depth structural framework map according to Example 2 of the present invention.

Then, the structural framework maps at the plurality of scales, which represent the relative cover depths, are stacked one upon the other to generate a composite cover depth structural framework map. FIG. 10 illustrates a composite cover depth structural framework map obtained by stacking the obtained structural framework maps representing relative cover depths after upward continuing the gridded TMI anomaly data for heights of 100 m, 200 m, 300 m, 400 m and 500 m. It can be seen from the map, at different scales, cover depths of major structural belts change obviously, usually the structures at deeper cover depths, i.e., with thicker cover layers, has lower value of TMI anomalies, and the structures are hidden structures and thus this method facilitates the identification of hidden structures.

Then, a three-dimensional analytic signal $AS_h$ is calculated for the gridded TMI anomaly data at each scale. The value of the resulted analytic signal $AS_h$ is independent of the magnitude of the magnetic inclination, and can be used for indicating locations and magnetic intensity of source bodies of magnetic anomalies.

Figure 11:
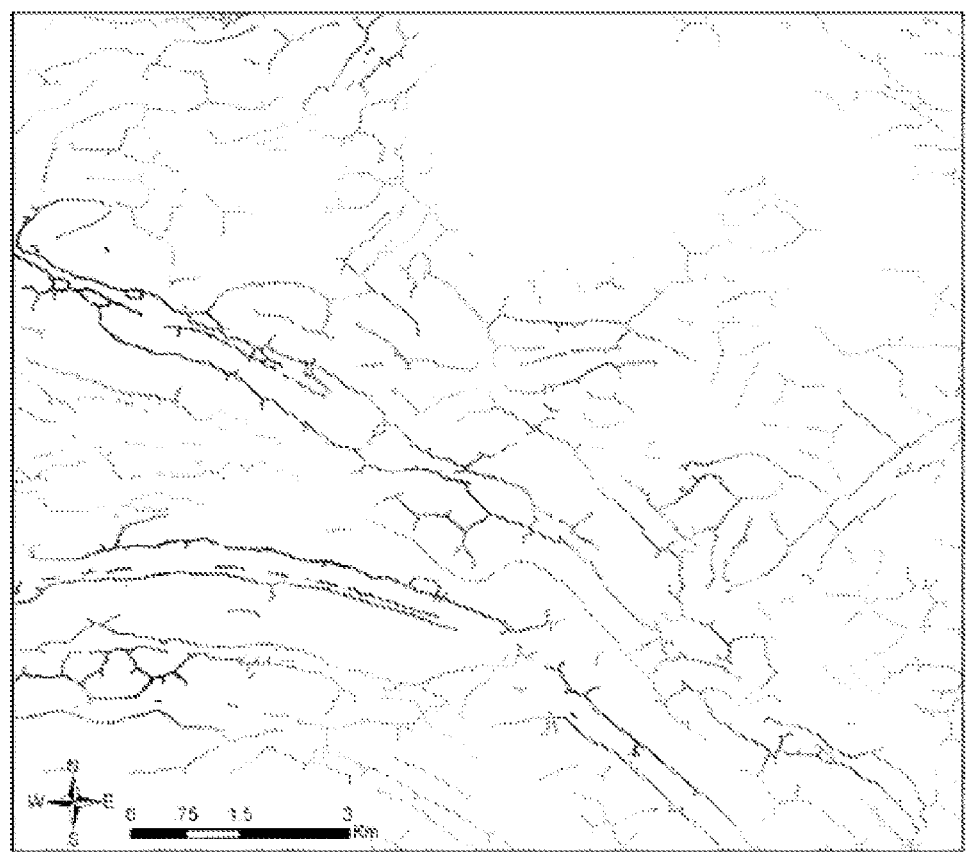
FIG. 11 illustrates a structural framework map reflecting magnetic intensity according to Example 2 of the present invention.

In this example, the $AS_h$ value of each edge point on the framework at each scale is used for indicating the magnetic intensity of the structure. FIG. 11 illustrates a structural framework map with the $AS_h$ values indicating the magnetic intensity of edges points of the framework upward continued for a height of 300 m, and colors gradually changing from grey white to black represent that magnetism of structural belts indicated by analytic signal $AS_h$ values gradually increases.

Figure 12:
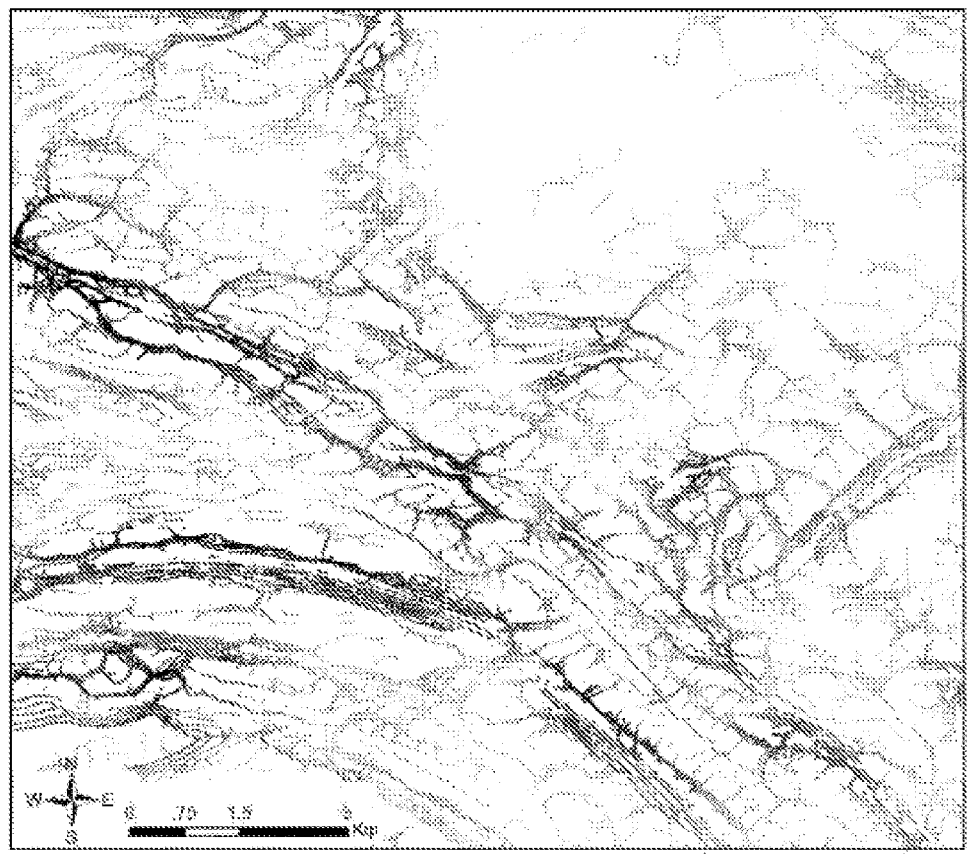
FIG. 12 illustrates a composite magnetic intensity structural framework map according to Example 2 of the present invention.

Then, the magnetic intensity structural framework maps at the plurality of scales are stacked one upon the other to generate a composite magnetic intensity structural framework map. As illustrated in FIG. 12, $AS_h$ values of the edges at all scales or depths are stacked one upon the other and rendered with the colors gradually changing from grey white to black to highlight information about magnetism changes of structural frameworks at different depths.

Without considering the cover depths of source bodies, the amplitude of the three-dimensional analytic signal $AS_h$ indicates magnetic intensity of sources of magnetic anomalies, and structures with strong magnetism usually have a close relation with ore formation.

In addition, by observing FIG. 8 and FIG. 10, structural framework maps with information about the cutting depth and intensity may clearly reflect primary structures of deep depths and long extension in the area, secondary structures of shallow depths and short extension, cover depths of the structures as well as mutual cutting relations. Therefore, the structural framework map obtained by the method according to the present invention can help one skilled in the art to recognize the structural framework of the surveyed area.

Area near the structural belts with strong magnetism and deep depths, intersection parts of structures of different directions, as well as the turned and curved parts of the structural belts are important locations where potential metal ore deposits may be discovered. With the method according to the present invention, structural framework maps with information about cutting depth, cover depth, magnetic intensity, primary and secondary relation, cutting relation and the like can be rapidly and accurately extracted from magnetic measure data, and help the explorers to accurately and rapidly discover potential metal ore deposits.

The present invention has been described above in detail in combination with the preferred embodiments. However, the present invention is not limited thereto. One skilled in the art may make various modifications according to the principle of the present invention. Therefore, modifications made according to the principle of the present invention shall be all understood as included in the protection scope of the present invention.

The invention claimed is:

1. A computer-implemented method for automatically extracting a structural framework from potential field data, comprising the steps:
   preprocessing the potential field data from a study area;
   upward continuing the preprocessed potential field data for a plurality of predetermined heights to obtain a plurality of potential field data at corresponding scales to the plurality of predetermined heights;
   applying multidirectional edge detection respectively to the potential field data at a plurality of scales to obtain a plurality of potential field edges at the corresponding scales; and
   thinning the obtained potential field edges at the plurality of scales respectively into single-pixel width with a morphological skeleton algorithm to obtain a plurality of structural framework maps at the corresponding scales, wherein information is obtained from the plurality of structural framework maps about geological structures controlling a formation of ore deposits to achieve localization of targets of the ore deposits.

2. The computer-implemented method for automatically extracting the structural framework from the potential field data according to claim 1, wherein the method further comprises stacking the plurality of structural framework maps at the corresponding scales to generate a composite structural framework map.

3. The computer-implemented method for automatically extracting the structural framework from the potential field data according to claim 2, wherein, a changing of colors is used to represent heights to form the composite structural framework map.

4. The computer-implemented method for automatically extracting the structural framework from the potential field data according to claim 1, wherein the method further comprises:
   using a gradient modulus of each edge point of each the potential field edges on each structural framework map at a corresponding scale as an intensity value of the each edge point on the structural framework map at the corresponding scale to obtain a plurality of structural intensity framework maps at the corresponding scales.

5. The computer-implemented method for automatically extracting the structural framework from the potential field data according to claim 4, wherein the method further comprises stacking the plurality of structural intensity framework maps at the corresponding scales to generate a composite structural intensity framework map.

6. The computer-implemented method for automatically extracting the structural framework from the potential field data according to claim 5, wherein a changing of colors is used to represent magnitudes of the intensity values of the edge points to form the composite structural intensity framework map.

7. The computer-implemented method for automatically extracting the structural framework from the potential field data according to claim 1, wherein the potential field data is gravity potential field data or magnetic potential field data, wherein preprocessing the potential field data includes:
   preprocessing the gravity potential field data to obtain Bouguer gravity anomalies when the potential field data is gravity potential field data or
   reducing the magnetic potential field data to a pole to obtain reduction-to-pole magnetic anomalies or applying pseudo-gravity transformation to the magnetic potential field data to obtain pseudo-gravity anomalies when the potential field data is magnetic potential field data.

8. The computer-implemented method for automatically extracting the structural framework from the potential field data according to claim 1, wherein,
   the step of applying multidirectional edge detection to the potential field data at each of the plurality of scales includes defining a gravity anomaly or magnetic anomaly at a location (x, y) at height of zero as $f_0(x, y)$ upon determining that the scale $s=z/z_0$, $z>z_0$, $z_0$ is a measurement height and z is height increasing upward,
   defining a smoothing function at the scale s as:

$$\theta_s(x,y)=s^{-2}\theta(x/s+y/s)=\gamma_{sz_0}(x,y),$$

wherein $$y_{sz_0}(x, y) = \frac{1}{2\pi}k(x, y, sz_0),$$

k(x, y, z) is Green's function, defining a wavelet function in direction $\alpha$ as:

$$\psi^\alpha = \left(\cos\alpha\frac{\partial}{\partial x} + \sin\alpha\frac{\partial}{\partial y}\right)\theta(x, y) = D^\alpha\theta(x, y),$$

wherein D represents a first-order derivative;

for the scale s and the location (x, y), defining wavelet transform of the gravity anomaly or magnetic anomaly $f_0(x, y)$ in direction $\alpha$ as:

$$W^\alpha[f_0](x, y, s) = [f_0 * \psi_s^\alpha](x, y)$$
$$= f_0 * (sD^\alpha\theta_s)$$
$$= sD^\alpha[f_0 * \theta_s]$$
$$= sD^\alpha[f_0 * \gamma_{sz_0}]$$

wherein * represents convolution operation,
$f_z(x, y)=f_0(x, y)*\gamma_{sz_0}(x, y)$ is according to a potential field upward continuation formula, and
$f_z(x, y)$ is a gravity anomaly or a magnetic anomaly via upward continuation of $f_0(x, y)$ from height zero to height $z=sz_0$ and is obtained by upward continuing the gravity anomaly or magnetic anomaly $f_{z0}(x, y)$ measured at measurement height $z_0$ for height $z-z_0$,
then, $$W^\alpha[f_0](x,y,s)=sD^\alpha f_z(x,y)$$
$$=(z/z_0)D^\alpha f_z(x,y);$$

further, for the scale s and the location (x, y), defining a wavelet transform of the gravity anomaly or magnetic anomaly $f_0(x, y)$ in direction $$\alpha+\frac{\pi}{2}$$

as:

$$W^{\alpha+\frac{\pi}{2}}[f_0](x, y, s) = (z/z_0)D^{\alpha+\frac{\pi}{2}}f_z(x, y)$$

then, a two-dimensional directional wavelet transform of $f_0(x, y)$ is written as in gradient:

$$W[f_0](x, y, s, \alpha) = \begin{pmatrix} W^{\alpha}[f_0](x, y, s) \\ W^{\alpha+\frac{\pi}{2}}[f_0](x, y, s) \end{pmatrix} = (z/z_0)\begin{pmatrix} D^{\alpha}f_z(x, y) \\ D^{\alpha+\frac{\pi}{2}}f_z(x, y) \end{pmatrix}$$

$$W[f_0](x, y, s, \alpha) = (z/z_0)\nabla f_z(x, y, \alpha)$$

wherein $\nabla$ denotes a two-dimensional gradient,
for height z, defining a gradient modulus $\nabla f_z(x, y, \alpha)$ as:

$$M[f_z](x, y, \alpha) = \sqrt{|D^{\alpha}f_z(x, y)|^2 + |D^{\alpha+\frac{\pi}{2}}f_z(x, y)|^2},$$

wherein the corresponding argument of the gradient along a horizontal direction is:

$$Af_z(x, y, \alpha) = \text{argument}(D^{\alpha}f_z(x, y) + D^{\alpha+\frac{\pi}{2}}f_z(x, y)),$$

and
  defining a point where the gradient modulus $M[f_z](x, y, \alpha)$ is local maximum along the argument direction $Af_z(x, y, \alpha)$ as an edge point,
  in each direction $\alpha$, forming a curve by connecting points with local maximum of the gradient modulus in a direction perpendicular to the gradient to create an edge, and
  for the height z, calculating the edges in a plurality of different directions $\alpha$ and taking a union of the edges as the potential field edges at the corresponding scales.

9. The computer-implemented method for automatically extracting the structural framework from the potential field data according to claim 8, wherein the step of calculating the edges in the plurality of different directions $\alpha$ for the height z further comprises: taking a direction value $\alpha$ as $k\pi/(2^{n-1})$, wherein $k=0, 1, 2 \ldots (2^n-1)$ and n is an integer greater than or equal to 2, so as to completely cover a two-dimensional plane.

10. The computer-implemented method for automatically extracting the structural framework from the potential field data according to claim 8, wherein the potential field edges obtained from the potential fields upward-continued for the plurality of predetermined heights are corresponded to structures at different depths to form the plurality of structural framework maps, and stacking the structural framework maps upon one another is completed to obtain a composite structural framework map reflecting information at different depths.

11. A computer-implemented method for automatically extracting a structural framework, comprising the following steps:
  preprocessing magnetic data or gravity survey data from a study area to obtain total magnetic intensity (TMI) anomaly data or Bouguer gravity anomaly data;
  gridding the TMI anomaly data or the Bouguer gravity anomaly data, and upward continuing the gridded TMI anomaly data or the Bouguer gravity anomaly data for a plurality of predetermined heights to obtain a plurality of gridded TMI anomaly data or Bouguer gravity anomaly data $T_h$ at corresponding scales to the plurality of predetermined heights, wherein h represents height after upward continuation;
  respectively calculating a tilt derivative $TDR_h$ of the TMI anomaly data or the Bouguer gravity anomaly data at each of the corresponding scales from the gridded TMI anomaly data or Bouguer gravity anomaly data $T_h$ at each of the corresponding scales;
  applying multidirectional edge detection based on a horizontal gradient respectively to the tilt derivative of the gridded TMI anomaly data or Bouguer gravity anomaly data at each of the corresponding scales to obtain edges of source bodies of magnetic or gravity anomalies at the corresponding scales; and
  thinning the obtained edges of source bodies of magnetic or gravity anomalies at the corresponding scales respectively into single-pixel width with a morphological skeleton algorithm to obtain a plurality of structural framework maps at the corresponding scales, wherein information is obtained from the plurality of structural framework maps about geological structures controlling a formation of ore deposits to achieve localization of targets of the ore deposits.

12. The computer-implemented method for automatically extracting the structural framework according to claim 11, wherein the method further comprises stacking the plurality of structural framework maps at the corresponding scales to generate a composite structural framework map.

13. The computer-implemented method for automatically extracting the structural framework according to claim 12, wherein the method further comprises corresponding edges extracted from the gridded TMI anomaly data or Bouguer gravity anomaly data upward continued for the plurality of predetermined heights to structures at different depths, and stacking the plurality of structural framework maps at the different depths to obtain the composite structural framework map reflecting information about different cutting depths.

14. The computer-implemented method for automatically extracting the structural framework according to claim 11, wherein the step of applying multidirectional edge detection based on the horizontal gradient respectively to the tilt derivative of the gridded TMI anomaly data or Bouguer gravity anomaly data at each of the corresponding scales comprises the following steps:
  respectively defining directional derivatives of the tilt derivative $TDR_h$ in directions $\alpha$ and $$\alpha + \frac{\pi}{2}$$

as:

$$D^{\alpha}TDR_h = \left(\cos\alpha\frac{\partial}{\partial x} + \sin\alpha\frac{\partial}{\partial y}\right)TDR_h$$

$$D^{\alpha+\frac{\pi}{2}}TDR_h = \left(\cos\left(\alpha+\frac{\pi}{2}\right)\frac{\partial}{\partial x} + \sin\left(\alpha+\frac{\pi}{2}\right)\frac{\partial}{\partial y}\right)TDR_h$$

wherein D represents a first-order derivative;
for a height h and a direction α, representing the horizontal gradient of the tilt derivative $TDR_h$ as:

$$\nabla TDR_h^\alpha = \begin{pmatrix} D^\alpha TDR_h \\ D^{\alpha+\frac{\pi}{2}} TDR_h \end{pmatrix}$$

wherein $\nabla$ is the horizontal gradient;
defining modulus of the horizontal gradient $\nabla TDR_h^\alpha$ as:

$$MTDR_h^\alpha = \sqrt{|D^\alpha TDR_h|^2 + |D^{\alpha+\frac{\pi}{2}} TDR_h|^2}$$

wherein argument of the horizontal gradient is:

$$ATDR_h^\alpha = \text{argument}(D^\alpha TDR_h + D^{\alpha+\frac{\pi}{2}} TDR_h),$$

and
then, defining points where modulus $MTDR_h^\alpha$ is local maximum along argument direction $ATDR_h^\alpha$ as edge points of source bodies of magnetic or gravity anomalies at the height h in direction α;
in each direction α, forming a curve by connecting the points with local maximum of modulus of the horizontal gradient of tilt derivative $TDR_h$ in a direction perpendicular to the gradient to create an edge, and
for the height h, calculating edges in a plurality of different directions α and taking a union of the edges as edges of source bodies of magnetic or gravity anomalies at the corresponding scales,
wherein the plurality of different direction α respectively taken as $k\pi/(2^{n-1})$, wherein k=0, 1, 2 ... ($2^n$−1) and n is an integer greater than or equal to 2.

15. The computer-implemented method for automatically extracting the structural framework according to claim 14, wherein the method further comprises:
respectively using the modulus of the horizontal gradient at each edge point on the structural framework map at each of the corresponding scales to represent a structural cover depth at the edge point on the structural framework map at each of the corresponding scales to obtain a plurality of structural framework maps representing structural cover depths at the corresponding scales.

16. The computer-implemented method for automatically extracting the structural framework according to claim 15, wherein the method further comprises stacking the plurality of structural framework maps representing structural cover depths at the corresponding scales to generate a composite cover depth structural framework map.

17. The computer-implemented method for automatically extracting the structural framework according to claim 11, wherein the method further comprises:
respectively calculating a three-dimensional analytic signal $AS_h$ based on the gridded TMI anomaly data or Bouguer gravity anomaly data $T_h$ at each of the corresponding scales to obtain an $AS_h$ value of each edge point on the structural framework map, to obtain a plurality of structural framework maps representing intensity of magnetism or density of edge points at the corresponding scales.

18. The computer-implemented method for automatically extracting the structural framework according to claim 17, wherein the method further comprises stacking the plurality of structural framework maps representing intensity of magnetism or density of edge points at the corresponding scales to generate a composite magnetic intensity structural framework map or a composite density intensity structural framework map.

19. The computer-implemented method for automatically extracting the structural framework according to claim 11, wherein the method further comprises performing noise reduction processing to the tilt derivatives before edge detection.

20. The computer-implemented method for automatically extracting the structural framework according to claim 11, wherein the method includes automatic extraction of a magnetic structural framework in a low-latitude area wherein, the method includes a magnetic measure data of an area with a magnetic inclination in range of ±30° or a magnetic measure data of an area with a magnetic inclination in range of ±20°.

* * * * *